US008694579B2

(12) United States Patent
Kurtenbach et al.

(10) Patent No.: US 8,694,579 B2
(45) Date of Patent: Apr. 8, 2014

(54) ENTERPRISE NETWORK SYSTEM FOR PROGRAMMABLE ELECTRONIC DISPLAYS

(75) Inventors: Reece A. Kurtenbach, Brookings, SD (US); Brian F. Vogl, Brookings, SD (US); Joseph G. Schulte, Brookings, SD (US); Jeremy C. Johnson, Brookings, SD (US); Brent A. Joffer, Brookings, SD (US); Steven J. Top, Brookings, SD (US); Thomas R. Mittan, Brookings, SD (US)

(73) Assignee: Daktronics, Inc., Brookings, SD (US)

( * ) Notice: Subject to any disclaimer, the term of this patent is extended or adjusted under 35 U.S.C. 154(b) by 502 days.

(21) Appl. No.: 12/761,829

(22) Filed: Apr. 16, 2010

(65) Prior Publication Data

US 2010/0268768 A1 Oct. 21, 2010

Related U.S. Application Data

(60) Provisional application No. 61/170,409, filed on Apr. 17, 2009.

(51) Int. Cl.
*G06F 15/16* (2006.01)

(52) U.S. Cl.
USPC ............ 709/203; 709/204; 709/205; 345/1.1; 345/204; 725/140; 725/152

(58) Field of Classification Search
USPC ............ 709/203–205; 725/140, 152; 345/1.1, 345/204
See application file for complete search history.

(56) References Cited

U.S. PATENT DOCUMENTS

| | | | | |
|---|---|---|---|---|
| 6,430,603 B2 * | 8/2002 | Hunter | | 709/207 |
| 6,430,605 B2 * | 8/2002 | Hunter | | 709/207 |
| 7,146,567 B1 * | 12/2006 | Duczmal et al. | | 715/736 |
| 7,515,136 B1 * | 4/2009 | Kanevsky et al. | | 345/156 |
| 2002/0156677 A1 * | 10/2002 | Peters et al. | | 705/14 |
| 2002/0165776 A1 * | 11/2002 | Hunter | | 705/14 |
| 2003/0217170 A1 * | 11/2003 | Nelson et al. | | 709/231 |
| 2004/0128198 A1 * | 7/2004 | Register et al. | | 705/14 |
| 2006/0113378 A1 * | 6/2006 | Wilcox et al. | | 235/380 |
| 2007/0203840 A1 * | 8/2007 | Liu | | 705/51 |

(Continued)

FOREIGN PATENT DOCUMENTS

WO WO-98/41936 A1 9/1998

OTHER PUBLICATIONS

"International Application Serial No. PCT/US2010/001138, International Search Report mailed Aug. 5, 2010", 3 pgs.

(Continued)

*Primary Examiner* — Backhean Tiv
(74) *Attorney, Agent, or Firm* — Schwegman, Lundberg & Woessner, P.A.

(57) ABSTRACT

A client-server based enterprise network system providing network services and applications to administer, manage, control access to, and use a plurality of programmable electronic display devices and systems is disclosed. The enterprise network system may include client-server network system configurations and methods to enable a plurality of enterprise users to expeditiously, efficiently and securely access and use enterprise network resources and capabilities, including provisioning of graphical display content on a plurality of programmable electronic display systems sited locally, regionally, globally or in combination thereof. The enterprise network system and the network services and capabilities here disclosed, may be accessed through Web-enabled applications with Internet/Web browsers, which enable users to access network services and capabilities from any Internet/Web-enabled computer or workstation from any location.

25 Claims, 10 Drawing Sheets

(56) References Cited

U.S. PATENT DOCUMENTS

| | | | |
|---|---|---|---|
| 2008/0189184 A1* | 8/2008 | Kubo et al. | 705/16 |
| 2008/0294521 A1* | 11/2008 | Rozman | 705/14 |
| 2010/0153410 A1* | 6/2010 | Jin et al. | 707/758 |
| 2010/0180213 A1* | 7/2010 | Karageorgos et al. | 715/753 |

OTHER PUBLICATIONS

"International Application Serial No. PCT/US2010/001138, Written Opinion mailed Aug. 5, 2010", 8 pgs.

"International Application Serial No. PCT/US2010/001138, International Preliminary Report on Patentability mailed Oct. 27, 2011", 9 pgs.

* cited by examiner

ENTERPRISE NETWORK SYSTEM FOR PROGRAMMABLE ELECTRONIC DISPLAYS

CROSS REFERENCE TO RELATED APPLICATION

This application claims the benefit of priority under 35 U.S.C. §119(e) to U.S. Provisional Patent Application Ser. No. 61/170,409, filed Apr. 17, 2009, entitled "An Enterprise Network System for Programmable Electronic Displays," the specification of which is herein incorporated by reference in its entirety.

BACKGROUND OF THE INVENTION

1. Field of the Invention

The present invention relates generally to client-server network systems. More specifically, the present invention is a client-server network system for securely managing access to and use of programmable electronic display devices (PEDD) and display systems by remote-client users. The client-server network of the present invention embodies an Internet/Web-enabled enterprise network system comprising client-server hardware, network system administrative and operating software and application support services, server-side and client-side application software, Internet/Web communication means, and security and access control means, which enable novel enterprise network system resources, workflow processes and business methods for securely transmitting, storing, manipulating validating and exhibiting graphical display content (GDC) visual images on remote PEDD and display systems anywhere in the world.

2. Description of the Prior Art

Client-server networks are known in the art. A typical client-server network provides a range of functional capabilities for creating and removing user accounts for performing data file management and communication such as transferring information between network clients, operating system software, applications, and data file backup and version control; and security means for controlling access and use by authorized network users thereof. These and other client-server network system capabilities may be provided by commercially available network operating systems and support software; however, the specific uses and purposes of these client-server network system relate to automating common business practices such as accounting, purchasing, manufacturing, inventory control, shipping, and so forth. Illustratively, prior art client-server networks teach apparatus, uses and means which construe advantages and benefits within the common weal of business information systems (BIS) and management information systems (MIS) well-described and well-understood in the art.

Client-server networks that operate Web-enabled applications also are known in the art. A typical Web-enabled client-server network provides means for client users to make use of resources and capabilities provided by Web servers using commercially available Web browsers such as Internet Explorer® or Firefox®, to name but two for purposes of example only. In general, the specific uses and purposes of these Web-enabled client-server networks is not exclusive to a class of users based on specific criteria such as common commercial goals, shared workflow processes and shared task management, and therefore not limiting to a user class based on the aforesaid criteria. Illustratively, prior art Web-enabled client-server networks teach apparatus, uses and means which construe advantages and benefits to a broad, non-exclusive class of users.

Programmable electronic display devices (PEDD) and display systems also are known in the art. A PEDD display system typically comprises an electronic display board that produces visual images by means of a grid of small light-emitting elements such as LEDs, LCDs, and the like; data handling means for managing transfer and storage of digital data files containing graphical content for display as visual images on an electronic display board; and control means for converting digital data files containing graphical content into control signals and output image data to produce visual images on an electronic display board for viewing by a viewing party or public.

PEDD display systems are commonly sited near public venues where the visual images they exhibit may be viewed simultaneously by large numbers of people in groups, such as at sporting events, or sequentially by smaller groups of people or individuals such as near transit terminals, escalators and powered walkways as well as near promenades and thoroughfares alongside roads and highways. PEDD display systems provide a valuable service to the public since they can provide timely or time-critical information such as stock and commodity prices, traffic and weather conditions, hazard alerts, and similar important information. PEDD display systems also are broadly and effectively used for presenting advertising, marketing and entertainment messages and similar such information to the public.

The graphical content that can be displayed on PEDD display systems is technology-dependent and generally limited by the means used to produce visual images on the electronic display board, as well as by the control means employed to manage digital data files containing graphical content and convert them into visual images on an electronic display board. Early prior art PEDD display systems consisted of a matrix or grid of small light-emitting elements which were turned on and off in simple patterns to produce text messages and primitive graphic images for viewing by the public. Depending on the capabilities of control means employed, these early prior art PEDD display systems were also capable of producing simple dynamic graphical effects such as paging, scrolling and primitive animations. Later in the development of the art, PEDD display systems employed more advanced means of producing visual images including the use of LED and LCD technology as light emitting elements, which enabled more complex and sophisticated visual images to be displayed on electronic display boards such as multi-tonal color graphics and video animations, for purposes of example.

Continuing improvements in the art have produced PEDD display systems that are increasingly larger in scale and more powerful with respect to the size, complexity and sophistication of visual images that can be displayed. The current art provides for PEDD display systems that can display near continuous-tone graphics, dynamic combinations of text and images, complex animations, recorded video sequences and live video streams, as well as real-time critical information such as hazard and weather alerts.

Improvements in the methods and practice of producing PEDD display systems, as well as advances in the sophistication and complexity of graphical content that can be displayed, have created greater acceptance and increasing demand by the public for use of PEDD display systems, as well as a concomitant increase in the volume of images that users want to display. However, as the art has advanced and the graphical content that can be displayed has become more sophisticated, the digital data files containing graphical content have increased in size and complexity and the number and types of digital data file formats (e.g., MOV, AVI, WMF, etc.) used to produce graphical content have proliferated. These trends create a number of barriers to ready access and use of PEDD display systems that hinder satisfying a burgeoning public demand such as limited cognizance of PEDD display system site, availability and use restrictions; restricted data transfer rates resulting in delayed transmission of large digital data files; increased complexity of data file management and manipulation and a corresponding increase in burden on data management resources; expanded need for data storage capacity and maintenance; and similar such practical requirements which must be addressed to ensure public demand can be met and the art may continue to advance. It would therefore be desirable to develop means and methods providing practical solutions in overcoming the barriers to access and use of PEDD display systems resulting from these trends.

Unfortunately, prior art PEDD display systems embody means with inherent limitations and disadvantages in overcoming the aforesaid barriers hence failing to provide practical solutions to these and other problems. Prior art PEDD display systems typically comprise unitary apparatus embodying a solitary electronic display board and discrete board controller having dedicated control means. Said dedicated control means typically allow only a single authorized user, such as a PEDD display owner or operator, to access and operate a solitary PEDD display system. This inherent limitation was intentional by design: a principal objective in the design and implementation of dedicated control means is to provide device security by restricting access to a few knowledgeable users. The prior art thus produced a plethora of discrete board controllers and dedicated control means as various manufacturers produced unitary PEDD display systems in the absence of accepted commercial practices or standards and in accordance with private commercial interests and goals. Accordingly, prior art PEDD control means employ dissimilar apparatus, means and methods in providing display capabilities, as well as variable display configurations, scale and aspect ratio, and other dissimilarities that affect how display content may be provided, managed, manipulated, transmitted and ultimately exhibited as visual images for viewing. Moreover, prior art PEDD system control means employed by one device may operate by specialized methods including commands, control functions, protocols, utilities and tools that are unusable or inoperable when applied to other PEDD system control means employed by a different device due to differences in operating platform and operating system software, support hardware, the technology employed to produce visual images on an electronic display board, the size and aspect ratio of the electronic display board, and similar differences. Additionally, prior art PEDD control means were not designed with the object of allowing ready communication between any two or more PEDD display systems for purposes of file sharing, or for conversant coordination of exhibition schedules, or for coordination of display content across a plurality of PEDD display systems to optimize presentation of visual images to a viewing party or public. Nor does the obvious workaround of simply transferring digital data files containing graphical content prepared for display on a first PEDD display system to a second PEDD display system prove practicable, since discrete programmable control means employed were not designed with the object of easily allowing graphical content data file transfer between devices and since the inherent differences between PEDD operating characteristics still obtain, with the result that graphical content prepared for use with one PEDD display system may not match the use requirements of a second PEDD display system. These inherent limitations of prior art PEDD system control means not only present barriers to communication between devices but also exacerbate the difficulties in access and use of PEDD display systems sited in foreign countries, since there is no common set of tools or means useful and efficacious in overcoming the barriers of language, use restrictions, data communications protocols, and the like, with the result that each prior art PEDD display system and discrete control means thereof must be specially adapted for use. It would therefore be desirable to develop means and methods providing practical solutions in overcoming these aforesaid inherent limitations and disadvantages of the prior art.

An outgrowth of the greater acceptance and demand for access and use of PEDD display systems, as well as of the advances in the sophistication and complexity of the types of graphical content that can be displayed, is a proliferation of related workflow tasks including: creation of graphical display content; transfer and storage of graphical content digital data files; validation, approval, disapproval and/or modification of graphical content submitted for exhibition; recording offer of sale, acceptance of sale, and execution of sale of PEDD display system use; scheduling graphical content data files for display and coordinating display times across a plurality of PEDD display systems sited in remote locations; manipulation and conversion of graphical content digital data files into output image data to produce visual images for exhibition; and access and control of PEDD display systems to communicate operating status, to perform configuration updates and maintenance, to request diagnostic and error information and similar administrative and operational purposes. It would therefore be desirable to provide means and methods addressing the proliferation of workflow tasks such as automated coordination of workflow tasks, task management and communication, and task status reporting and notification.

The aforesaid proliferation of workflow tasks has resulted in the creation of specialized roles among PEDD display system users who need on-demand secure access to PEDD display system capabilities to perform tasks quickly and efficiently. PEDD display system users with specialized roles include display content creators such as graphics designers, commercial artists and animators; display content providers such as advertisers and marketers, PEDD display system operators such as owners and administrators and sales specialists, among others. Prior art PEDD display systems have provided no means for on-demand secure access to PEDD display system capabilities by a plurality of users having specialized roles, since this was not an object in the design and manufacture of prior art devices and since proliferation of workflow tasks and the resultant specialization of user roles was not foreseen. Additional roles for role based systems include: authorities submitting information like an AMBER ALERT, weather emergencies, homeland security alerts, police emergencies, any of which might be targeted at affected areas (for example a ZIP code) with an opt-in model to cause display. It would therefore be desirable to provide means and methods that support specialized user roles and requirements thereof, such as providing on-demand secure access to PEDD display system capabilities thereby enabling users to perform specialized role tasks quickly and efficiently and granting use rights based on user role requirements.

A further outgrowth of the greater acceptance and demand for access and use of PEDD display systems is the proliferation of site locations where visual images can be exhibited, which together with proliferation of workflow tasks and specialization of user roles has produced workflow restrictions and limitations that impede the ability of PEDD display system operators to offer use to the largest number of potential customers and for PEDD display system users to perform workflow tasks most efficiently and thereby to make use of PEDD display systems most effectively. In the prior art, PEDD display system owners or their subordinates performed all use tasks by direct intervention, such as loading graphical content digital data files into device memory or on-board data storage for exhibition, performing requested changes to device operating schedules, and revising graphical content scheduled for exhibition such as by substitution or modification of data files. Once made, all such changes and modifications must be communicated to PEDD display system users by separate action, such as by telephone or email, since there is no means to automatically notify users that workflow tasks such as requested changes to graphical content data files have been performed. Moreover, since PEDD display system customers who lease use of PEDD display time, such as advertisers, lack direct access to PEDD display system capabilities they are excluded from the scheduling process and made captive participants in an unreliable change communication process, which leads to misunderstandings and errors that result in iterative actions to complete requested changes and modifications with all the inherent inefficiencies thereof. Likewise, graphical content creators are barred from transmitting graphical content data files directly to PEDD display systems when simple substitutions are requested; notwithstanding that PEDD display system operators may have initiated the requested substitution. The same restrictions and limitations apply to review and approval workflow processes for vetting new graphical content for exhibition, resulting in the same inherent inefficiencies. It would therefore be desirable to provide means and methods that enable users to directly access PEDD display system capabilities to perform workflow and use tasks without requiring intervention by PEDD display system operators. It is also desirable to provide means of automatic notification of workflow task requests, task status and completion.

Yet another outgrowth of the greater acceptance and demand for access and use of PEDD display systems is the need for knowledgeable intermediaries between PEDD display system operators, who sell lease-use of their display systems, and lease-use buyers such as advertisers and marketers. The need for knowledgeable intermediaries has driven creation of the specialized role of sales consultants, who transact agreements between lease-use sellers and lease-use buyers. Currently, lease-use agreements are transacted directly between PEDD display system operators and their customers. But greater acceptance of PEDD display systems as a developing communication channel to the public, as well as the proliferation of PEDD display system locations, has created demand for coordination of lease-use operation across a plurality of PEDD display system sites, such as for an advertising campaign, based on value criteria such as PEDD site location, time of exhibition, iterations of images during exhibition time, cost of lease-use purchase, potential number of viewers, and similar criteria. It therefore becomes difficult for lease-use buyers to orchestrate coordinated lease-use operation across a plurality of PEDD display system sites, since they may lack knowledge or insight regarding the aforesaid value criteria. Furthermore, portions of the plurality of PEDD display system sites selected for coordinated exhibition of visual images may be owned by different PEDD operators, who may be market competitors, and agreements for lease-use operation must be separately transacted, each producing separate transaction documents including records of sale, invoice, payment and credit. Thus, knowledgeable intermediaries such as sales consultants provide valuable service in transacting agreements between PEDD lease-use sellers and buyers, particularly in effecting coordinated use across a plurality of PEDD display system site locations, but the same restrictions and limitations of access to PEDD display systems applies to them with similarly resultant inefficiencies in performing workflow tasks. It would therefore be desirable to provide automated means of coordinating access and use of PEDD display systems across a plurality of site locations. It is also desirable to provide means of automating transactions of PEDD display system lease-use agreements between sellers and buyers including automating the production, dissemination and recording of transaction documents.

Additional consideration in the greater acceptance and demand for access and use of PEDD display systems is the lack of automated means to acquire PEDD device status and operating history such as current configuration, run-time and error logs, audit trails, and similar data for purposes of generating operational and status reports or identifying service issues. The current art provides for such reports in some instances but each such report must be separately and manually produced at the request of the lease-use customer by the PEDD display system owner/operator, who may charge a service fee, and which may impose significant time and cost burden on lease-use customers particularly in cases of coordinated use across a plurality of PEDD display system site locations. Such imperfect reporting means in the prior art makes it difficult for lease-use customers to ensure that graphic content scheduled for exhibit on any given PEDD display system actually occurred according to agreement with expected value received. It would therefore be desirable to provide means and methods that enable PEDD display system users including lease-use customers to automatically acquire PEDD display system status and operating history reports on-demand.

In summation, the current art is generally dependent on manual or conventional means of performing and communicating workflow tasks and transacting lease-use agreements in providing access to and use of PEDD display system capabilities to the public including mail, email, telephone, voicemail, paper records, and the like. As a result, workflow processes in the creation, modification, approval and exhibition of graphical display content are slow and inefficient; means to organize PEDD display system users into classes or groups based on a common set of goals, or on specialized roles and tasks, or on a coordinated task management methodology is absent; PEDD display system time scheduling and use tasks are unnecessarily difficult to perform; broadcast of time-critical messaging is delayed; coordinated use across a plurality of PEDD display system site locations is unnecessarily complicated; the transaction of agreements between lease-use buyers and sellers is impeded; and PEDD display system operational and status reports are difficult to acquire and burdensome to process.

A novel approach to address the aforesaid deficiencies of means and methods in the prior art is needed urgently to continue to satisfy public demand and thereby ensure continuing development of the art. Means and methods novel and efficacious must embody automated tools provided to PEDD display system users that: (1) eliminate barriers to ready access and use of PEDD display systems to satisfy burgeoning public demand; (2) eliminate restrictions and limitations that impede users in performing workflow tasks most efficiently and in making use of PEDD display systems most effectively; (3) provide on-demand secure access and use of PEDD display system capabilities to an exclusive class of users based on specialized user roles; (4) automate workflow processes in the creation and approval of graphical content created for exhibition on PEDD display systems, in transacting lease-use agreements, and in providing direct access and use of PEDD display system capabilities to users based on specialized roles; (5) automate workflow process task management, task action and task status notification among a plurality of PEDD display system users having a common set of goals; (6) automate communication between a plurality of PEDD display system users in performing workflow tasks in achieving a common set of goals; and (7) automate means for producing and disseminating PEDD display system operational and status reports. Additionally, consideration and accommodation of the following aspects must be included: dynamic building of content to fit displays of various sizes and configurations; opt-in models for receiving published information (e.g., AMBER ALERTS, emergency news, etc. that are targeted at applicable areas or audiences; ability to control multiple different types of players and displays (LED, LCD, etc.); ability to manage content distribution at different levels including adding/removing content at different levels; ability to have unique schedules at a display level yet be able to create sales across groups of displays and even schedule content in even more unique groups for distribution. This includes the ability to schedule content, but not the ability to control overall scheduling of display, rather only the portion or fraction of time allocated; ability to interrupt schedule from control system for "moments of exclusivity" by switching to an alternative schedule/content for emergency use or other purposes, which is controlled at a local player level by physical or programmatic interface. Other concepts to consider and accommodate include: controlling different types of players: V-Net, V-Play, V-1500, V-7000); hosted/non-hosted appliances of site controllers and/or aggregators; bit torrent type technology; push and pull communications; security, role-based and/or rights controlled; workflow, notifications, and task management; business, invoicing, and online sales of time slots; reporting POP; dynamic content, data services (DDS); system restrictions for compliance; keyframe, extranet and processes; and configurations, auto-updating, and diagnostic functions.

SUMMARY OF THE INVENTION

The present invention addresses and resolves the aforementioned deficiencies of means and methods of the prior art by providing a novel enterprise network system for PEDD display systems that organizes and enrolls PEDD display system users into an enterprise body for the purpose of sharing advantages, benefits and resources provided by the enterprise network system and to promote greater access to and efficient use of PEDD display systems in response to public demand, thereby to perform workflow tasks efficiently.

The general purpose of the present invention is to provide an Internet/Web-enabled enterprise network system that equips PEDD display system users with an integrated suite of network-based applications, services and resources via public-access Internet to efficiently access and use PEDD display systems. The integrated suite of network-based applications, services and resources of the present invention include, but are not limited to, Web-enabled client-server computer hardware; client-server operating system software and network and application software and support services; client-server network communications hardware, operating software, applications and support services; client-server user application programs, support services and utilities; data file transfer, management and storage services and data file conversion utilities; task-management services and utilities; Web-browser applications and support services; and Web-enabled PEDD display systems, operating software and support services.

According to a first preferred embodiment of the present invention, there is provided a Web-enabled client-server enterprise network system that embodies said integrated suite of network-based applications, services and resources in support of access control and security means, automated workflow process means and e-commerce business means, whereby the inherent and engendered disadvantages of prior art PEDD display systems are both generally and specifically overcome. Advantageously, the enterprise network system of the present invention provides capabilities and resources for administering, managing and controlling the access, use, data file transfer, operation, and presentation of graphical display content (GDC) data files for exhibition on a plurality of remote PEDD display systems through Web-enabled applications and to perform numerous and varied workflow tasks pertaining thereto. The preferred enterprise network system here disclosed provides means for a plurality of users at remote-client workstations to easily and securely access and use said integrated suite of network-based resources to create, upload, approve, modify, schedule and exhibit graphical display content on a plurality of PEDD display systems located at a plurality of sites locally, regionally and globally. The enterprise network system and the integrated suite of network-based resources thereof are accessed and used via commercially available Internet/Web browser programs, which provide means to enterprise users to request network services and capabilities from any Web-enabled remote-client from any location in the world where Internet/Web capabilities are obtainable. Further, the enterprise network system here disclosed provides means for overcoming workflow and use barriers and restrictions inherent to the disparate operating and design characteristics of prior art PEDD display systems, as heretofore described.

Advantageously, the Internet/Web-enabled enterprise network system of the present invention precludes many of the installation and configuration problems inherent in the initial setup and configuration of remote-client workstations, since a client application required to interface with the enterprise network system to access the integrated suite of network-based applications, services and resources and to perform workflow tasks can be delivered via the pubic Internet and run within a commercially available Web-browser, thereby obviating many client application compatibility issues and problems that otherwise might occur due to disparate configurations and operating characteristics of client workstations. Additional advantages obtain wherein the Internet/Web-enabled design paradigm of the enterprise network system of the present invention simplifies performing the many and varied workflow tasks associated with using PEDD display systems effectively, since remote-client users need not be provided with custom application programs and utilities other than a client application operatively executing within a Web-browser, nor provided with specialized training and user manuals to use custom applications.

Still further advantages obtain through the use of standard, commercially available Web-browsers, which simplifies enterprise network system development by limiting the design, support and operating requirements in the creation of a client application to graphical user interface (GUI) screen pages, data presentation and management means, and workflow task management means based on the use of a common GUI and standard Web-browser operating shell. Hence, the design and development resources that otherwise might be consumed in developing client applications are levied advantageously to the development and delivery of the enterprise network system of the present invention.

Advantages also obtain to remote-client users. The popularity of the public Internet and commercially available Web-browsers allows platform independence for remote-client workstation users, since users may choose from among workstation platforms, Internet connections, and Web-browser applications based on personal preferences and needs as opposed to network system requirements and limitations. The enterprise network system of the present invention also reduces the need for user training and support documentation, since the client application executes with the Web-browser of the user's choice, which most users will already know how to use. Moreover, if the remote-client user upgrades the Web-browser to a later version; or re-configures, upgrades or replaces the remote-client workstation, enterprise network resources and capabilities are restored as quickly as Internet/Web communications to the remote-client workstation are reestablished.

According to this preferred embodiment, the above-cited advantages are obtained by means of a Web-enabled enterprise network central server operatively equipped to enable remote-client users with authentication and appropriate use rights to securely access enterprise network resources and services thereby to perform workflow tasks from Web-enabled remote-client workstations. The enterprise network system of the preferred embodiment includes a Web-browser application running in said remote-client workstation and providing an operating shell and integrated interface to operatively execute a remote-client enterprise application. The Web-browser application further provides a GUI for interfacing with the remote-client enterprise application enabling users to perform workflow tasks. The Web-enabled central server communicates with remote-client workstations over the public Internet via the Web-browser application and the remote-client enterprise application running therein, authenticates the remote-client user before enabling access to enterprise network resources, and grants appropriate use rights based on user roles to enable users to execute appropriate enterprise workflow tasks. The central server allows the remote-client user to access only those network resources to which the user is entitled by authentication and use rights. A plurality of object functional capabilities and means for accessing enterprise network resources and for performing related enterprise workflow tasks are included within the remote-client application.

The enterprise network system of the present invention provides means to create enterprise accounts, to assign users to enterprise accounts and grant authentication and use rights, to organize users into groups and associations; and to view and manage enterprise accounts, users assigned to enterprise accounts, and user groups and associations, The enterprise network system also provides means to create PEDD display system device accounts, to assign Web-enabled PEDD display systems to enterprise network device accounts, to configure PEDD display system device accounts with capabilities and limitations based on PEDD operating characteristics, to apportion PEDD display system operating time into time-segments or event-segments for scheduling and assigning graphical content data files for exhibition, to organize a selected plurality PEDD display systems into groups, and to view and manage PEDD display system device accounts, configurations, and groups. Additional means are provided to generate and transmit PEDD display system operational and status reports such as run-time and error logs, configuration status and audit trails, among others.

The enterprise network system of the present invention provides remote-client users with means to upload GDC data files to a network central server for storage in a media storage vault and to download GDC data files from said media storage vault to a remote-client workstation, to preview GDC data files intended for display for review purposes and to request changes or modifications with review comments; to view, modify, replace and delete GDC data files stored within said network central server storage vault; to request exhibition of GDC data files, to approve request of GDC data files for exhibition, to assign GDC data files to PEDD display device schedules for exhibition, to transfer GDC data files scheduled for exhibition to PEDD display systems, to convert GDC data files into output image data for display on PEDD display systems for viewing by a viewing party or public, and to perform numerous and varied related enterprise workflow tasks pertaining thereto.

The enterprise network system of the present invention provides enterprise users with automated means to enact e-commerce business transactions, wherein enterprise network system resources such as PEDD display system operating time segments are offered for tease-use sale, sales agreements are transacted between sellers and buyers including coordinated use across a plurality of PEDD display systems; contracts of sale are recorded, invoices are delivered, payments are made, and various other related enterprise workflow tasks pertaining thereto are performed within the enterprise network system.

The Internet/Web-enabled design paradigm of the enterprise network system of the present invention, and the integrated suite of network-based applications, services and resources it provides, convey numerous advantages and benefits as well as improved freedom and flexibility in the use and access of PEDD display systems, while overcoming many of the disadvantages and limitations of the prior art. For example, utilizing the enterprise network system of the present invention, a remote-client user may submit GDC data files far display on a PEDD system and receive approval from a PEDD system owner instantly. Further, a remote-client user may receive review comments and requested changes to GDC data files by a PEDD display system operator, make the requested changes, and re-submit a modified GDC data file for approval in real-time. Enterprise account-holders can create user groups and associations to grant on-demand access to enterprise network resources and capabilities provided to the account, thereby enabling users to perform workflow tasks quickly and efficiently. Users with lease-use agreements can control the assignment and scheduling of GDC data files on PEDD display systems for which they own lease-use rights without having to request intervention by the PEDD display system operator and can obtain PEDD display system operating reports such as run-time and error logs quickly and easily, thereby to establish proof of performance and value received. Disparities between PEDD display system control means are overcome, since the enterprise network system maintains configuration records of device type, use requirements and operating characteristics for each Web-enabled PEDD display system in the enterprise network and applies rules and restrictions in the submission, conversion, assignment and scheduling of GDC data files scheduled for exhibition on any given PEDD display device, as appropriate. Other advantages and benefits provided by the enterprise network system here disclosed include automated PEDD schedule maintenance, automated provisioning of GDC data files to PEDD display systems, and automated creation and dissemination of operational and status reports.

Numerous features, aspects, advantageous and functions are present or result from or flow from such an enterprise network system for programmable electronic displays and/or to users thereof and, moreover, can accommodate earlier recognized network needs. The system is non-hierarchical in that it is generally "community" or "peer" based architecture. This allows entities-users (such as organizations, companies, educational facilities, etc.) to grant access into their respective portions of the system with as extensive or as restrictive access rights as they deem appropriate. In many ways, the enterprise system is almost like a proxy concept system without having to invoke the corporate administration of the entire system. Entity-users can search inventory, make sales, schedule, manage media, perform tasks, create commentary, and generally perform other tasks that heretofore traditionally would only be performed by a content originating entity. The enterprise platform would allow network (display) owners to allow others (whether a specifically designated entity-user or all entity-users) to search the network (display) owner's network for opportunities (i.e., open inventory). That is, a network owner (or owners) may make inventory open and therefore searchable by specifically designated entity-user or even all entity-users, so as to encourage more sales opportunities. For example, an advertising agency or advertiser or another network-owner could perform searches across multiple networks to find inventory in areas or target audiences that match needs and then purchase that inventory and subsequently manage a campaign across all networks as a single one might be managed. Moreover, recognize the need satisfied by the enterprise network system for dynamic generation of content to fit or conform to different sizes of audiences in order to support external information sources, such as by way of example only, an AMBER ALERT.

Having thus briefly described an embodiment of the present invention, and having mentioned some of the significant aspects and features of the present invention, it is a principal object of the enterprise network system of the present invention to provide means and methods operative and efficacious to organize and enroll PEDD display system operators and users into an exclusive enterprise body having a common set of goals and providing on-demand, secure access to enterprise network system resources and PEDD display system capabilities. An important aspect of the aforesaid principal object is to fully automate access and use of PEDD display systems by enterprise users having specialized roles and to fully automate GDC data file management, workflow processes, task management, user communications, lease-use transactions and agreements, PEDD display system scheduling, and reporting requirements pertaining thereto. Accordingly, the enterprise network system of the present invention enables more expedient and more efficient performance and accomplishment of workflow tasks pertaining to access and use of PEDD display systems than was heretofore possible with the prior art by eliminating use barriers and restrictions, minimizing owner/operator intervention, and allowing greater freedom of access with a resultant savings in time and costs.

It is a further object of the enterprise network system of the present invention to provide automated e-commerce sales tools that enable and support e-commerce transactions between enterprise network system users including offer for sale, acceptance of sale, recording of transaction records including contractual agreement, execution of contract terms, invoicing and payment relating to sale of enterprise network system resources including media data file library space, enterprise network use fees, PEDD display system lease-use time, among others, to name a few for purposes of example.

A significant aspect and feature of the present invention is security and access control means provided to authenticate enterprise network system users and grant use rights based on user roles, wherein use rights determine the availability of specific enterprise network resources and capabilities granted to authenticated end-users.

Another significant aspect and feature of the present invention is providing enterprise network system users with shared enterprise resources including disk-vaults for media library storage and GDC data file maintenance, conversion means for converting GDC data files into smaller and more easily manipulated preview files for review, commentary and approval purposes; and task management tools to facilitate and expedite execution of workflow process tasks and to communicate task status among users.

BRIEF DESCRIPTION OF THE DRAWINGS

Other objects of the present invention and many of the attendant advantages of the present invention will be readily appreciated as the same becomes better understood by reference to the following detailed descriptions when considered in connection with the accompanying drawings, in which like reference numerals designate like parts throughout the figures thereof and wherein.

DETAILED DESCRIPTION OF THE PREFERRED EMBODIMENTS

Figure 1:
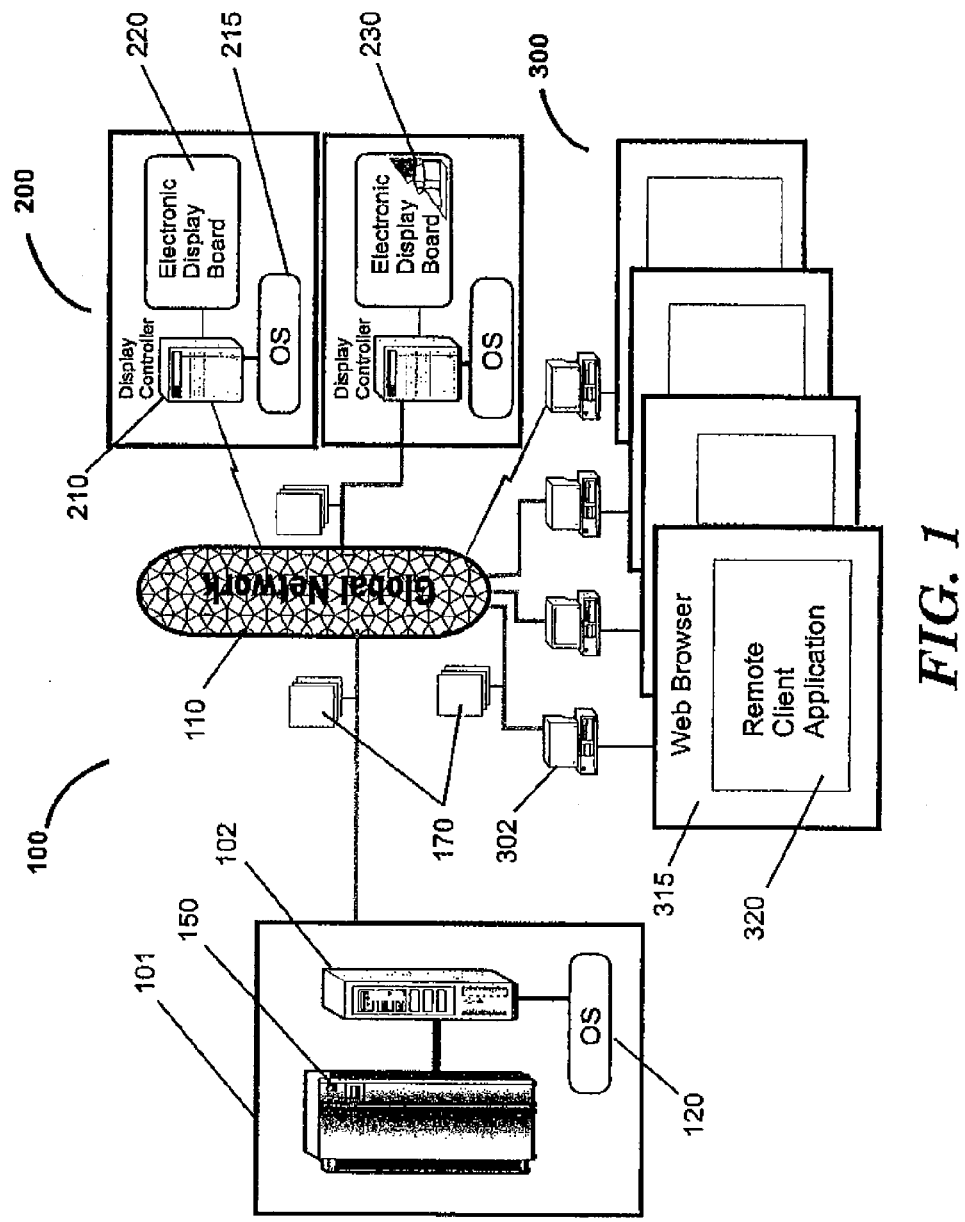
FIG. 1 is a conceptual illustration depicting in general overview a preferred embodiment of the enterprise network system.

Referring now to FIG. 1, a client-server enterprise network system 100 for network-enabled devices is shown in accordance with the present invention. Enterprise network system 100 apparatus includes a central server 101, one or more remote PEDD display systems 200, and one or more remote-clients 300 terminals or workstations. Enterprise network system 100, remote PEDD display systems 200 and remote-clients 300 are operatively coupled for communication and data transmission via global network 110 such as the public Internet.

Central server 101 embodies any standard and commercially available computer 102 designed and configured for network service operations such as a microcomputer, minicomputer, mainframe computer, or similar device, network operating system 120 and disk-vault storage means 150. Central server 101 and network operating system 120 operatively execute a plurality of network server applications (ref FIG. 2) including SQL database server 121, Web communications server 122, local interface application 123, media library server 124, email server 125, transcoding server 126, streaming media server 127 and configurations update server 128, described in greater detail hereinafter.

Figure 5:
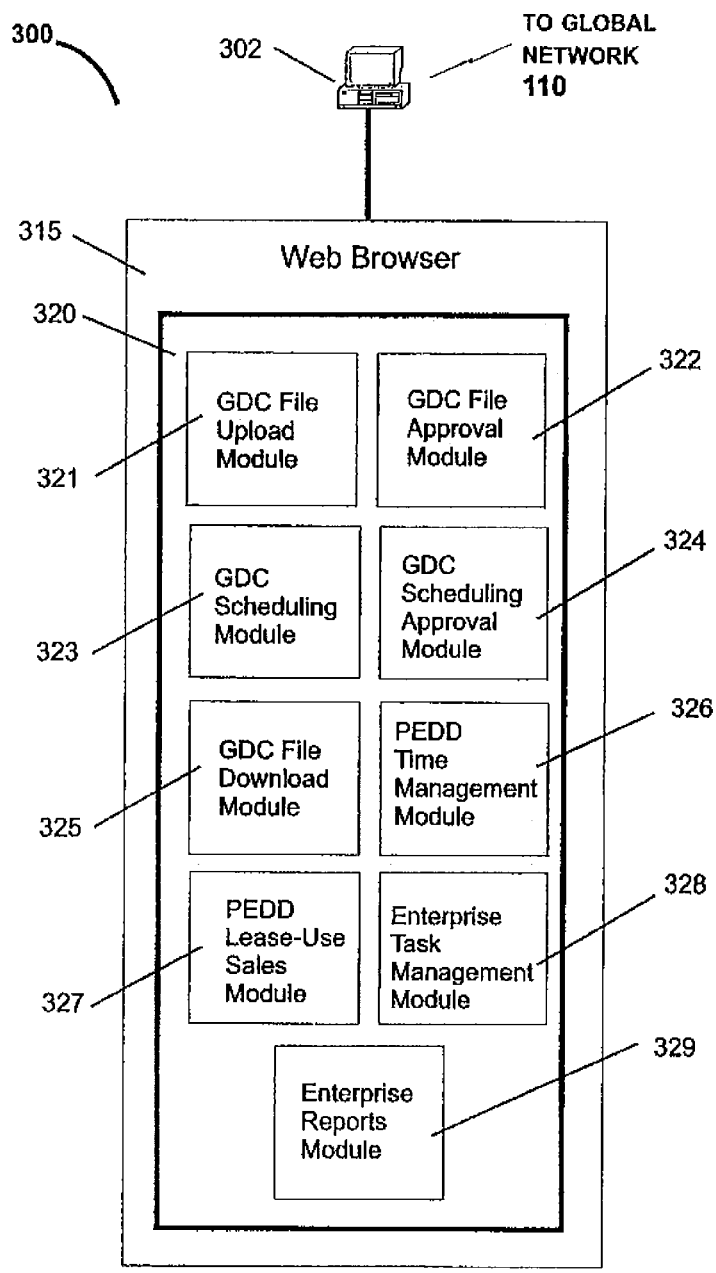
FIG. 5 is an illustrative block diagram depicting in general overview a characteristic embodiment of a plurality of remote client computer workstations of the enterprise network system.

Again referring to FIG. 1, remote-client 300 embodies a standard, commercially available and network-enabled computer terminal or workstation 302 operatively connected to global network 110 such as the public Internet; a standard, commercially available Web-browser 315 operatively communicating with central server 101 via global network 110; and remote-client application 320 which operatively executes within Web-browser 315 to enable enterprise network remote-client users to access and use capabilities and resources of enterprise network system 100. Referring now to FIG. 5, remote-client application 320 comprises various functional modules including GDC file upload module file 321, GDC file approval module 322, GDC scheduling module 323, GDC scheduling approval module 324, GDC file download module 325, PEDD time management module 326, PEDD lease-use sales module 327, enterprise task management module 328, and enterprise reports module 329, described in greater detail hereinafter. Referring again to FIG. 1, in one preferred embodiment remote-client 300 is operatively connected to and communicates with central server 101 via global network 110 executing standard Internet network communications and protocols well known in the art. In another preferred embodiment of enterprise network system 100, remote-client 300 is operatively connected to and communicates with central server 101 via global network 110 executing proprietary network communications and protocols.

Remote PEDD display system 200 embodies display controller 210, device operating system 215 and electronic display board 220 for exhibiting graphical display content produced as visual output images 230. Display controller 210 may embody any Web-enabled display controller operatively equipped with network communication means and operatively enabled to communicate with enterprise network 100 via global network 110. By way of example, said display controller 210 may embody the Daktronics V-Net® Display System Controller or the Daktronics® Venus® 7000 Display System Controller operatively driving one or more electronic display boards 220 and operatively coupled to global network 110 for Web-enabled communication and digital data file transfer with central server 101. Those skilled in the art will understand that reference to the aforesaid display controllers is for purposes of example only and shall not be considered limiting in scope of the types of remote PEDD display systems 200 that may be embodied within enterprise network system 100. Other PEDD display systems are described in U.S. Pat. No. 6,169,632, filed Feb. 9, 2000, entitled DISPLAY SYSTEM and in U.S. Pat. No. 5,949,581, filed Aug. 12, 1997, entitled DISPLAY SYSTEM. Both aforesaid patents are assigned to the assignee of the present invention and are hereby incorporated into this application by reference as if fully set forth herein.

Figure 2:
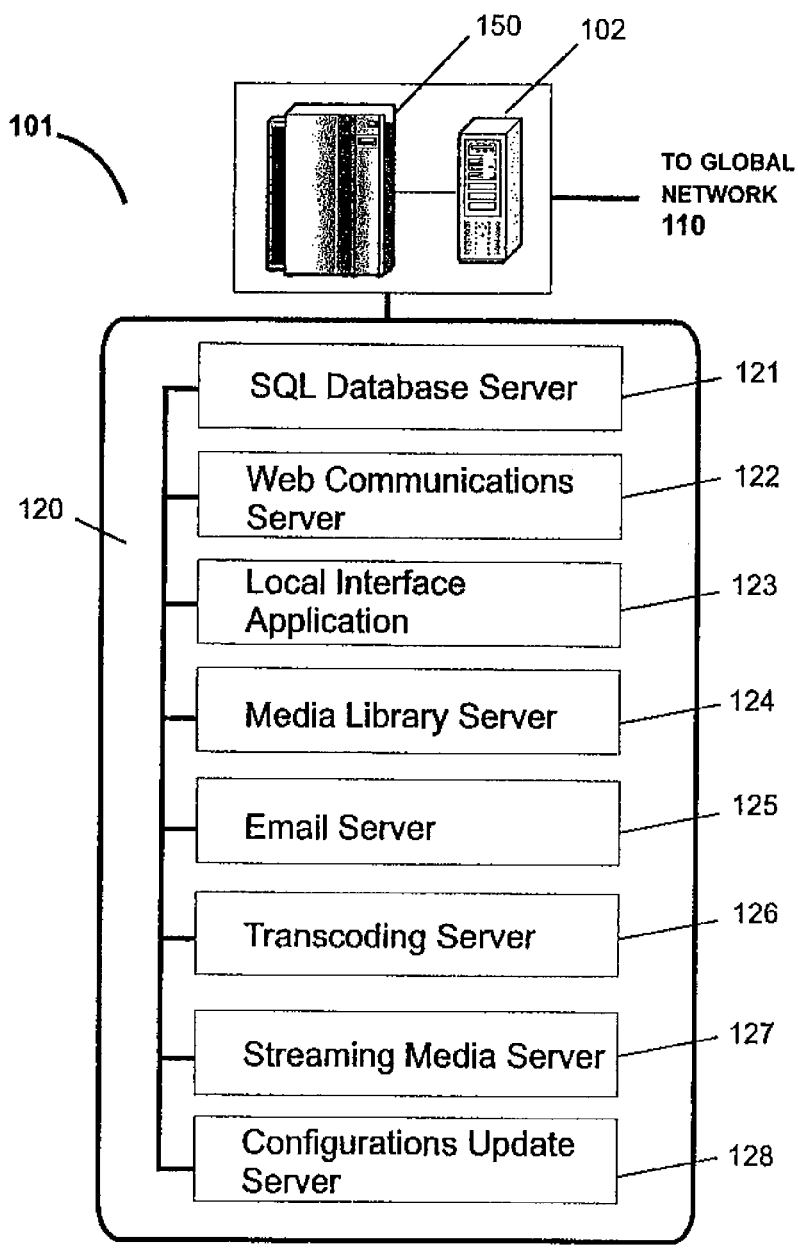
FIG. 2 is an illustrative block diagram depicting in general overview a preferred embodiment of the enterprise network central server.

FIG. 2 is an illustrative block diagram representing in more detail central server 101 of the present invention. Computer 102 runs network operating system 120 (ref. FIG. 1), which may be one of several public and commercially available network operating system applications such as WINDOWS SERVER® or LINUX® and which provides an operating system platform and application support services to operatively execute enterprise network server resources including SQL database server 121, Web communications server 122, local interface application 123, media library server 124, email server 125, transcoding server 126, streaming media server 127, and configurations update server 128. In a preferred embodiment of central server 101, network operating system 120 comprises WINDOWS SERVER® 2003; the processes, functions and characteristics of said preferred embodiment of network operating system 120 as described in Microsoft® Server 2003® API and User Guides provide a complete and detailed understanding of the operating system and use of said preferred embodiment and those documents are hereby incorporated in their entirety by reference thereto.

SQL database server 121 controls and maintains a data store which has been created and configured by network system administrators of central server 101 and which contains data created and recorded by them as well as by enterprise network users and incorporates information and identifiers for network hardware and system accounts, enterprise accounts, enterprise users, enterprise device accounts, digital data files and file identifiers, and similar other information and data store inherent to and supporting the means, uses, functions and processes of enterprise network 100. Operatively executing under control of network operating system 120, SQL database server 121 provides means operative and efficacious to access, store and retrieve digital data files from data store and to share data with other server elements and resources within central server 101, as appropriate to the uses and functions of enterprise network system 100.

SQL database server 121 may embody a commercially available SQL database server application. In a preferred embodiment of central server 101, SQL database server 121 comprises WINDOWS® SQL Server® 2005; the processes, functions and characteristics of said preferred embodiment of SQL database server 121 as described in WINDOWS® SQL Server® 2005 API and User Guides provide a complete and detailed understanding of the application and use of said first preferred embodiment and those documents are hereby incorporated in their entirety by reference thereto.

Web communications server 122 provides services for transmitting and receiving web communications via global network 110 to and from Web-enabled devices such as remote-clients 300 and remote PEDD display systems 200. Web communications server 122 may be any commercially available web communication application capable of performing web communication traffic management operatively executing under control of network operating system 120.

Local interface application 123 provides means for network system administrators of client server 101 to administer enterprise network system operational and functional requirements such as to create enterprise network accounts and manage accounts, to allocate disk-vault space for account media libraries and to manage account media libraries, to assign users to enterprise network accounts and to user groups and manage account users and user groups, to assign use rights to users based on roles and user group associations, to create enterprise client device accounts and device configurations and manage client device accounts and configurations, to create client device group configurations and to manage client device group configurations, to upload and download digital data files, to generate operating and status reports and administrative reports, to perform configuration updates and network system maintenance, and to perform other enterprise network administrative tasks as appropriate to the uses and functions of enterprise network system 100. Local interface application 122 is a dedicated network system application operatively enabled to effect network system administrative tasks under control of a network system administrator. In one preferred embodiment of central server 101, local interface application 123 comprises Daktronics® Visiconn Digital Management DBS Web Server; the processes, functions and characteristics of said preferred embodiment of Web communications server 122, as described in Visiconn—DBS Web Application/Functionality Implementation Details, provides a complete and detailed understanding of said preferred embodiment and that document is hereby incorporated in its entirety by reference thereto.

Media library server 124 controls media library created by network system administrators of central server 101 using local interface application 123 and residing on disk-vault 150, which is operatively configured to store and retrieve digital media such as GDC data files 170. Network system administrators of central server 101 create and assign vault location for enterprise network accounts in disk-vault 150 and configure space allocation for storing digital media within media library designated for secure access and use by enterprise account-holders and account-assigned users. Network operating system 120 operatively coordinates network service functions between media library server 124 and Web communications server 122 to receive and transmit digital media files, such as GDC data files 170, via global network 110 to and from Web-enabled devices such as remote-clients 300 and remote PEDD display systems 200, as appropriate to the uses and functions of enterprise network system 100. Media library server 124 may be any commercially available digital media management application capable of performing digital media data file management and control functions including storage, maintenance and retrieval under control of network operating system 120.

Email server 125 controls electronic mail (email) accounts, created by network system administrators of central server 101 using local interface application 123 for enterprise network users, which is operatively configured to send, receive, store and manage electronic mail. Email server 125 provides server-side email services from central server 101 enabling enterprise network users to send and receive email messages and attachments within the enterprise network. Network operating system 120 operatively coordinates network service functions between email server 125 and Web communications server 122 to receive and transmit email messages via global network 110 to and from Web-enabled devices such as remote-clients 300. Additional email services provided by email server 125 include security scanning to detect and remove viruses and the like, automatic response messaging, scheduled retrieval of status reports and updates, incident alerts and other capabilities appropriate to the uses and functions of enterprise network system 100. Email server 125 may be any commercially available electronic mail server application capable of providing email service functions under control of network operating system 120.

Transcoding server 126 automatically creates smaller preview files (not shown) from GDC data files 170 stored in disk-vault 150 and controlled by media library server 124, which is operatively configured to store and retrieve preview files on-demand as requested by enterprise users in normal performance of workflow tasks. Network system administrators of central server 101 create and assign vault location for enterprise network accounts in disk-vault 150 using local interface application 123 and configure space allocation for storing preview files within media library designated for secure access and use by enterprise account-holders and account-assigned users. Transcoding server 126 provides server-side replication and conversion services from central server 101 operatively executing any of a plurality of CODEC converter utilities appropriate to the type of GDC data files 170 being converted into preview files. Network operating system 120 operatively coordinates network service functions between Web communications server 122, media library server 124, transcoding server 120 and disk-vault 150 to replicate, convert, store and retrieve preview files converted from GDC data files 170 received from Web-enabled devices such as remote-clients 300 via global network 110 and to transmit said preview files to remote-clients 300 by similar means, as appropriate to the uses and functions of enterprise network system 100.

It is known in the art that digital graphic image files such as multi-color continuous tone graphics, multi-layered graphics and other complex and data-intensive digital images generally comprise very large data files. It is further known in the art that digital graphic image files created for use on remote PEDD display systems 200 exact an additional data overburden due to the large scale of electronic display boards 220, the number of light-emitting pixel elements that must be supplied image data, and the complexity of control signals required to coordinate graphic image data to produce output images 230. Hence, transmission of very large data files, such as GDC data files 170 created for use on remote PEDD display systems 200, are demanding of network communications data transmission resources and time-consuming for users to transmit and receive. Using unmodified GDC data files 170 to perform workflow process in the enterprise network system 100 of the present invention, such as review and approval tasks, would levy an unwanted data management and file transfer burden, as well as costly and time-consuming inconvenience on enterprise network users. Advantageously, transcoding server 120 renders preview files from GDC data files 170 automatically as they are uploaded by remote-clients 300 users without requiring intervention by network system administrators or other enterprise network users. Also advantageously, central server 101 provides preview files on-demand upon request to enterprise network users, thereby providing significant benefit of instant access preview of GDC data files 170 when performing workflow process tasks and task management and reducing data management and data transfer overburdens on Web communications server 122, media library server 124, disk-vault 150 and global network 110, thereby reducing overall operational burden on enterprise network system 100.

Transcoding server 126 may be any commercially available transcoding server application capable of performing GDC data files 170 replication and conversion functions under control of network operating system 120 operatively executing a plurality of various CODEC converters as appropriate. In a preferred embodiment of central server 101, transcoding server 126 comprises a Rhozet Carbon Coder Server; the processes, functions and characteristics of said preferred embodiment of transcoding server 126 as described in the Rhozet Carbon Code Transcoder API and User Guides provide a complete and detailed understanding of said preferred embodiment and those documents are hereby incorporated in their entirety by reference thereto.

Streaming media server 127 provides services for delivering dynamic digital media (DDM), such as streaming video and audio GDC data files 170 previously uploaded by enterprise users, to media library within disk-vault 150 of central server 101, for local viewing of DDM content by enterprise network users, such as remote-clients 300. GDC data files 170 may incorporate DDM content for which transcoding server 126 creates preview files as previously set forth. Streaming media server 127 compresses and renders DDM preview files into streaming media data and delivers same automatically and on-demand upon request of enterprise network users. Streaming media server 127 delivers DDM conforming to any of a plurality of streaming media formats known in the art (e.g., AVI, WMV, MPEG, MPG, MOV).

Certain advantages obtain to enterprise users through the provisioning of DDM streaming media by streaming media server 127 as network-enabled resource within enterprise network system 100 of the present invention. It is known in the art that DDM content, including video sequences, animations, instant replay and video-telephony, are complex and data-intensive media that produce very large data files even in compressed form. In the art, there are two primary means for transmitting DDM data files between Web-enabled devices across a global network such as the public Internet. The primary first means employs standard Web-server file transfer services and protocols to deliver DDM data files to a media player residing on a network client device such as a user workstation. This first means requires that the Web-server compress and download the entire DDM data file to the client workstation memory before a media player resident on the client device may decompress media content and execute media play for viewing by the network client user. The primary second means employs a separate streaming media server resident on the network server that is specifically designed for and specialized to the task of transmitting DDM data files across a global network and supersedes standard Web-server file transfer services for transmitting DDM files to network client devices. This second means requires that the network client device embody a media player configured and enabled to receive streaming-media from the streaming media server resident on the network server. The streaming media server compresses and downloads an initial portion of the DDM data file to the network client device, which buffers the initial portion in memory, whereupon the client-resident streaming media player decompresses the initial portion of the DDM data file and executes media play of the DDM content contained therein for viewing by the network client user; simultaneously, the streaming media server compresses and downloads subsequent portions of the DDM data file where it is buffered in client device memory, decompressed and media play executed as required for continuous viewing of DDM content.

In consideration of the aforesaid two primary means of transmitting DDM data files across the enterprise network system 100 of the present invention, those skilled in the art will understand that DDM content and the corresponding data files thereof created for use in enterprise network system 100 client devices, such as remote-clients 300 and remote PEDD display systems 200, exact an additional data management overburden due to the large scale of electronic display boards 220, the number of light-emitting pixel elements that must be supplied image data for display, and the complexity of control signals required to coordinate DDM content data to produce visual output images 230 for viewing, and are therefore time-consuming to transmit and demanding of network data management resources. Hence, employing standard Web-server file transfer services and protocols to deliver DDM data files to enterprise network system 100 client devices to perform workflow process tasks, such as GDC content review and approval tasks, or to transmit GDC data files 170 containing DDM content to remote PEDD display systems 200, would levy an unwanted data management and transfer burden, as well as costly and time-consuming inconvenience on enterprise users.

Advantageously, enterprise network system 100 of the present invention provides streaming media services as network-enabled resource to overcome the disadvantages inherent in use of standard Web-server file transfer services and protocols while overcoming the additional data overburden heretofore described in the transmission and use of DDM data files within the enterprise network, thereby reducing data management and data transfer overburdens on central server 101, Web communications server 122, media library server 124, disk-vault 150 and global network 110, thereby reducing overall operational burden on enterprise network system 100. Also advantageously, streaming media server 127 provides DDM streaming media on-demand to enterprise network users, thereby overcoming the several and compounded disadvantages for enterprise network users in performing workflow process tasks resulting from the additional data overburden heretofore described and further providing significant benefit of instant access preview of DDM graphic content for performing workflow process tasks and task management, as appropriate to the uses and functions of enterprise network system 100.

Configuration updates server 128 provides software and configuration update services to enterprise network system 100 server-side and client-side devices. Configuration updates server 128 provides means for centrally managed and automatic server-side scheduling, distribution and execution of changes and modifications to operating systems, application programs and other software resources of enterprise network system 100 server-side and client-side devices including configuration updates, hot fixes and patches, service packs, security modules, device drivers, and the like. Network system administrators of central server 101 execute software updates, changes and modifications as needed to central server 101 applications and resources using local interface application 123 including network operating system 120, SQL database server 121, Web communications server 122, local interface application 123, media library server 124, email server 125, transcoding server 126, streaming media server 127, and configurations update server 128. Administrators of central server 101 also execute the timing and release of software updates, changes and modifications to network client device applications and resources including remote-clients 300 and remote PEDD display systems 200, which are downloaded from central server 101, as appropriate to the uses and functions of enterprise network system 100.

In an embodiment of enterprise network system 100 of the present invention, wherein certain advantages obtain to enterprise users, configuration updates server 128 provides network device configuration status and detection services enabling network system administrators of central server 101 using local interface application 123 to poll enterprise network client devices to determine those machines that require software updates, and to obtain operating and status reports pertaining thereto, obviating the need to broadcast download software updates to all network client devices, thus ensuring that only client devices requiring said software updates receive same, thereby saving licensing and user fee costs. Configuration updates server 128 further enables network system administrators of central server 101 using local interface application 123 to fully manage release and download distribution of all client device software updates, thus ensuring that all enterprise network system 100 client devices employ the most current software configurations, obviating problems and errors caused by client device configuration disparities inimical to efficient performance of workflow process tasks and task management. Server-side managed release and download distribution of all client device software updates further obviates the need for user intervention to manually download software updates from central server 101 and deploy changes and modifications, which reduces demand on enterprise network resources including bandwidth and disk space allocation, again with a resultant saving of time and cost. In this embodiment, enterprise network client devices are operatively enabled to automatically initiate downloaded software updates from central server 101 at client-device system start-up, and to execute changes and modifications without requiring user intervention, again with a resultant saving of time and cost. Alternatively, software updates and/or polling to identify network client devices requiring software updates maybe manually controlled by network system administrators if desired, for example, by broadcasting software updates, as needed, or issuing software updates on an individual basis to specifically identified network client devices.

Figure 3:
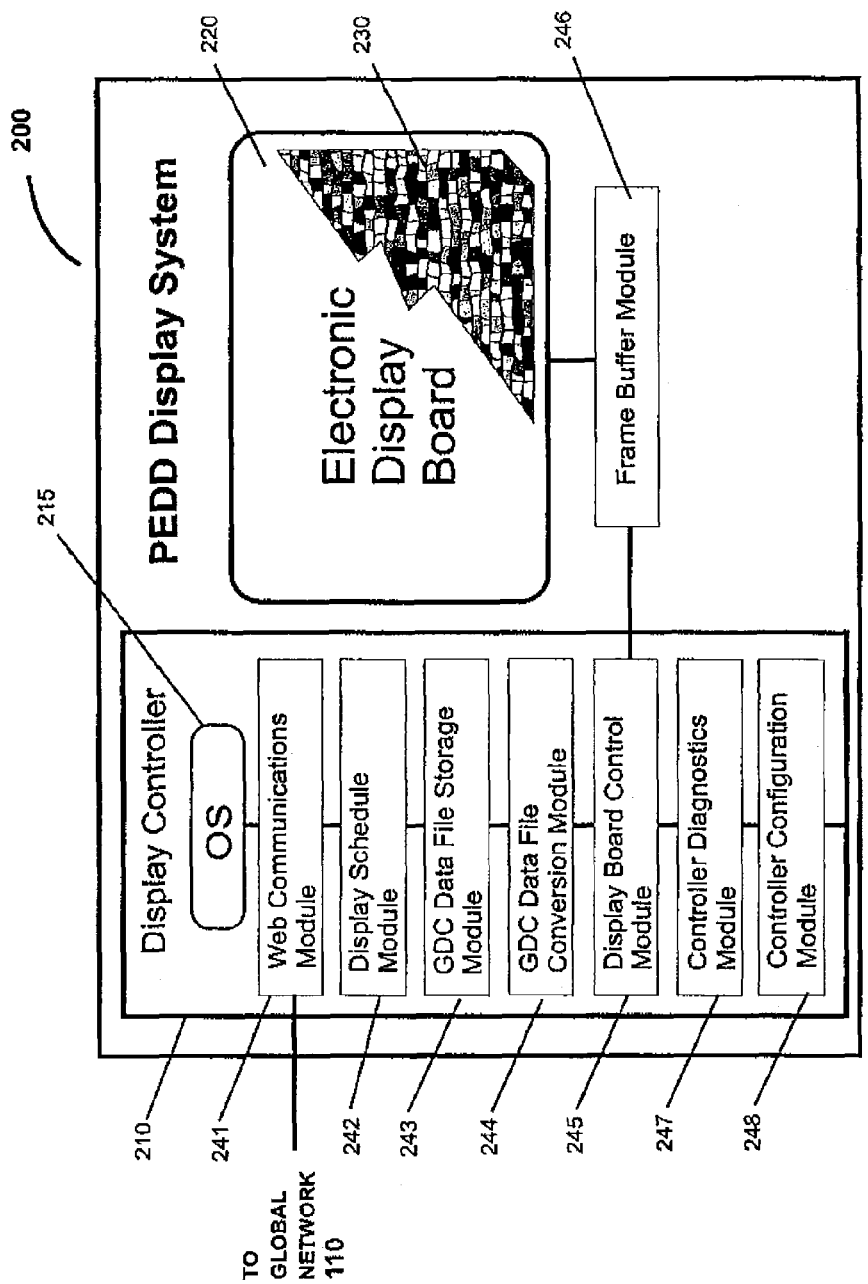
FIG. 3 is an illustrative block diagram depicting in general overview a characteristic embodiment of a plurality of network-enabled remote PEDD display systems of the enterprise network system.

FIG. 3 is an illustrative block diagram representing in more detail remote PEDD display system 200 of the present invention. Display controller 210 runs device operating system 215, which may be one of several public and commercially available operating system applications such as WINDOWS NT® or LINUX®, or may be a proprietary operating system, which provides an operating system platform and application support services to operatively execute Web-communications module 241, display schedule module 242, GDC data file storage module 243, GDC data file conversion module 244, display board control module 245, frame buffer module 246, controller diagnostics module 247, and controller configuration module 248.

Display controller 210 operatively drives electronic display board 220 to produce visual output images 230 for viewing by a viewing party or public. Display controller 210 operatively communicates via Web communications module 241 and global network 110 with central server 101 to receive data including new and updated GDC play lists (described hereinafter) and GDC data files 170, configuration changes, and operational and diagnostic information requests; and to transmit operational and diagnostic information and configuration status to central server 101 in response to status requests. Display controller 210 communicates with electronic display board 220 via dedicated electronic interface to transmit data and control signals and thereby produce visual output images 230 converted from GDC data files 170 for viewing by a viewing party or public.

Remote PEDD display system 200 is operatively and securely identified by a unique identification means, such as a one-time serial number encoded in hardware or firmware, and configured as a network-enabled resource, thereby allowing enterprise network users to identify and authenticate remote PEDD display systems 200 available for use thereby to perform enterprise workflow process tasks such as scheduling GDC data files 170 for exhibition. Each display controller 210 supports specific types of GDC data files 170 for exhibition of visual output images 230 on electronic display boards 220, depending on the type of electronic display board 220 used. For example, if electronic display board 220 is a static-type graphical display board, then two-dimensional graphical file formats (e.g., BMP, PG, TGA) are supported for exhibition by remote PEDD display controller 210. Alternately, if electronic display board 220 is a dynamic-type graphical display board, then both static graphical file formats and DDM file formats (e.g., AVI, MPG/MPEG, MOV, and WMA) are supported for exhibition by display controller 210. In another alternative embodiment, a unique serial number is not stored on hardware or firmware, but rather a GUID is stored on the computer's hard disk to provide a unique identification means.

Display controller 210 includes Web communications module 241, which controls sending and receiving communication to and from central server 101 via global network 110. Web communications module 241 may be any commercially available Internet/Web-enabled communication means operatively enabled to transmit and receive data over the public Internet, or may be a proprietary means to perform the same functions.

In an embodiment of enterprise network communications, remote PEDD display system 200 may be operatively connected to and communicate with central server 101 via global network 110 executing standard means and protocols well known in the art. In another embodiment, remote PEDD display system 200 may be operatively connected to and communicate with central server 101 via global network 110 executing proprietary means and protocols. In an enterprise network communication methodology subordinate to each aforesaid embodiments of enterprise network communications, as illustrated by the conceptual diagram in FIG. 4, remote PEDD display system 200 communicates with central server 101 in an active mode and initiates all communications with central server 101 at periodic or scheduled intervals via polling method, whereby communication is requested by remote PEDD display system 200 and granted by central server 101 and thereby established for transmitting and receiving data such as GDC play lists and GDC data files 170. In another embodiment of network communication methodology, again as illustrated by the conceptual diagram in FIG. 4, remote PEDD display system 200 communicates with central server 101 in a passive mode via command-response method, whereby central server 101 commands remote PEDD display system 200 to open communications on-demand, remote PEDD display system 200 responds accordingly and communication is thereby established for transmitting and receiving data. It shall be understood by those skilled in the art that each communication methodology is equally applicable to the aforesaid first and second embodiments of enterprise network communications, regardless of whether remote PEDD display device 200 communicates with central server 101 by executing either standard or proprietary means and protocols. It shall be further understood by those skilled in the art that enterprise network system 100 may include a plurality of remote PEDD display devices 200, wherein some devices communicate by active mode while others communicate by passive mode and either may execute standard means and protocols or proprietary means and protocols to operatively effect communication with central server 101 via global network 110. Alternatively, if desired, it is possible to operate the enterprise network system in an only "Active-like Mode" and with only "Pull" of schedules and data files by the display controllers.

Referring again to FIG. 3, display controller 210 includes display schedule module 242, which maintains a current display schedule of GDC data files 170 assigned for exhibition on electronic display board 220, identification strings and pointers to GDC data files 170 residing in GDC data file storage module 243, and a current display schedule with run-time pointers indicating schedule progress and status, thereby to operatively display visual images on electronic display board 220 adherent to a current display schedule for remote PEDD display device 200. Device operating system 215 operatively coordinates device operations between display schedule module 242 and Web communications module 241 to establish network communications with central server 101 via global network 110 to receive updated display schedules, as appropriate to the uses and functions of remote PEDD display systems 200.

Display controller 210 includes GDC data file storage module 243, which maintains within local on-line or off-line memory (not shown) media data file space wherein a current body of GDC data files 170 scheduled for exhibition on electronic display board 220 may be stored and retrieved on-demand. Device operating system 215 operatively coordinates device operations between GDC data file storage module 243 and Web communications module 241 to establish network communications with central server 101 via global network 110 to receive and store new and updated GDC data files 170 assigned to the display schedule maintained by display schedule module 242, as appropriate to the uses and functions of PEDD display systems 200.

Display controller 210 includes GDC data file conversion module 244, which converts GDC data files 170 retrieved from GDC data file storage module 243 into output image data and stations converted output image data in off-line data storage means (not shown), such as a disk-buffer, for retrieval by display board control module 245 as required. Device operating system 215 operatively coordinates device operations between GDC data file conversion module 244 and GDC data file storage module 243 to retrieve GDC data files 170 for conversion and transfer into off-line data storage means, as appropriate to the uses and functions of PEDD display systems 200.

Display controller 210 includes display board control module 245, which produces display board control signals to manage provisioning of output image data to drive electronic display board 220 to produce visual output images 230. Display board control module 245 retrieves converted output image data stationed in off-line data storage by GDC data file conversion module 244 and transfers it to frame buffer module 246 as required, thereby to produce output image signals that drive the light-emitting pixel elements of electronic display board 220 thereby to produce visual output images 230 for viewing by a viewing party or public. Device operating system 215 operatively coordinates device operations of display board control module 245 in retrieving output image data stationed in off-line data storage by GDC data file conversion module 244 and transferring it to frame buffer module 246, as appropriate to the uses and functions of remote PEDD display systems 200.

Display controller 210 includes controller diagnostics module 247, which performs real-time self-diagnostic tests and routines to generate and maintain current device diagnostic data, such as run-time and error logs and configuration status, used in operating and status reports by enterprise network users. Device operating system 215 operatively coordinates device operations between controller diagnostics module 247 and Web communications module 241 to establish network communications with central server 101 via global network 110 to transmit device diagnostic data, thereby to satisfy diagnostic and status report requests by central server 101, as appropriate to the uses and functions of enterprise network system 100.

Display controller 210 includes controller configuration module 248, which executes on-demand software modifications and updates to device operating system 215, application software and support services, device drivers and other system resources and maintains a current configuration record. Device operating system 215 operatively coordinates device operations between controller configuration module 248 and Web communications module 241 to establish network communications with central server 101 via global network 110 to receive configuration update files and to transmit configuration status information, as appropriate to the uses and functions of enterprise network system 100.

In a first preferred embodiment of remote PEDD display systems 200 of the present invention, display controller 210 comprises the Daktronics® V-Net® Display Controller; the apparatus, processes, functions and characteristics of said first preferred embodiment of display controller 210, as described in Daktronics® V-Net® Hardware Engineering Specification and Daktronics® V-Net® Software Engineering Specification, provide a complete and detailed understanding of the application of said first preferred embodiment and that document is hereby incorporated by in its entirety by reference thereto. Details of hardware configuration, internal communications, protocols and operation of said first preferred embodiment are further described in U.S. Pat. No. 5,949,581 filed Aug. 12, 1997, entitled "Display System," and U.S. Pat. No. 6,169,632 filed Feb. 9, 2000, entitled "Display System" and are hereby incorporated into this application by reference as if fully set forth herein. In a second preferred embodiment of remote PEDD display systems 200 of the present invention, display controller 210 comprises the Daktronics® Venus 7000® Display Controller; the apparatus, processes, functions and characteristics of said second preferred embodiment of display controller 210 as described in Daktronics® Venus 7000® Hardware Engineering Specification, and Daktronics® Venus 7000® Software Engineering Specification, Daktronics® Venus® 7000 Marquee Display Controller product literature SL-04623 Rev01 dated Mar. 1, 2005, provide a complete and detailed understanding of the application of said second preferred embodiment and that document is hereby incorporated in its entirety by reference thereto. Details of hardware configuration, internal communications, protocols and operation of said second preferred embodiment are further described in U.S. Pat. No. 6,819,303, entitled "Control System for an Electronic Sign (Video Display System)" filed Aug. 17, 1998, and is hereby incorporated into this application by reference as if fully set forth herein.

FIG. 5 is an illustrative block diagram representing in more detail remote-client 300 of the present invention. Remote-client 300 embodies a user or client computer 302, which may comprise any standard personal computer (PC) such as an IBM PC®, Apple® PC, or clone thereof, or other like computer functionally capable of operating within enterprise network system 100. Client computer 302 comprises typical computer components (not shown) including motherboard, central processing unit (CPU), memory in the form of random access memory (RAM); off-line data storage devices such as a hard disk drive, diskette drive, CD-ROM drive, tape drive, PCMCIA cards and the like; user interface components such as a monitor and display adaptor, keyboard and mouse; and communications components such as a network interface card (NIC), modem, cable modem, WIFI connection or similar means for effecting data communications to and from resources external to client computer 102 such as provided by enterprise network system 100 via global network 110. Client computer 102 typically embodies a conventional desktop computer, but can alternatively embody any Web-enabled terminal device capable of operatively executing remote client application 320 including portable or laptop computers; notebook, tablet and handheld computers, and similar such terminal devices and workstations.

Each client computer 302 provides an operating system (not shown) with application support services operatively loaded in RAM, such as UNIX®, LINUX®, WINDOWS®, Apple® OS, or the like, or alternatively may embody a proprietary operating system. Each client computer 302 further provides a Web-browser 315 with browser support services operatively loaded in RAM memory, such as Internet Explorer®, Netscape Navigator® or Firefox®, or any similarly designed Web-browser capable of operatively executing client application 320.

Client application 320 runs within Web-browser 315 and comprises an application program and support services which provide a command structure, graphical user interface and support services to operatively execute, under control of a client user, GDC file upload module 321, GDC file approval module 322, GDC scheduling module 323, GDC scheduling approval module 324, GDC file download module 325, PEDD time management module 326, PEDD lease-use sales module 327, enterprise task management module 328 and enterprise reports module 329.

Enterprise network users of client application 320 are assigned rights based on roles which define a set or subset of operating capabilities and functional privileges restricting and delimiting the network resources and operating capabilities of client application 320 that a client user may employ. User rights are further granted and restricted by assignment to groups and associations, wherein the client user so assigned is granted access to a restricted or delimited set of resources provided by enterprise accounts such as enterprise account media library containing GDC data files 170 and preview files, and allowed restricted access to enterprise network client devices such as remote PEDD display systems 200.

Referring again to FIG. 5 in reference to client application 320, GDC file upload module 321 is a functional module which provides a command structure, graphical interface and support services that enable client users with appropriate rights to upload GDC data files 170 via Web-browser 315 to media library residing within disk-vault 150 under control of media library server 124 of central server 101. GDC file upload module 321 performs validation tests on GDC data files 170 selected for upload by client users to validate that said files meet minimum use and format requirements prior to file upload. If GDC data files 170 meet minimum requirements, GDC file upload module 321 executes data file upload operations. If GDC data files 170 do not meet minimum requirements, GDC file upload module 321 restricts files from upload and notifies the remote-client 300 user of file deficiencies by posting GUI error and status messages. Advantageously, GDC file upload module 321 is operatively enabled to halt and resume uploading of large GDC data files 170 as needed.

GDC file approval module 322 is a functional module which provides a command structure, graphical interface and support services that enable client users with appropriate rights to view preview files of GDC data files 170 previously uploaded to media library residing in disk-vault 150 of central server 101 and designate them approved or disapproved for use. Preview files are generated by transcoding server 126 (ref FIG. 2) of central server 101 and provided on-demand to remote-client 300 users via global network 110 and displayed on client computer 302 of remote-client 300 for user review in performance of work flow tasks, as appropriate to the uses and functions of enterprise network system 100.

GDC scheduling module 323 is a functional module which provides a command structure, graphical interface and support services to enable client users with GDC scheduling rights to preview and schedule GDC data files 170 for exhibition on remote PEDD display systems 200. GDC scheduling module 323 provides remote-client 300 users with functional capabilities provided by remote client application 320 and presented within a GUI window (not shown) generated within Web-browser 315 to select one or more remote PEDD display systems 200 or configured display groups for assignment of GDC data files 170 for exhibition, to create PEDD scheduling blocks for remote PEDD display systems 200 and display groups, to select a plurality of GDC data files 170 for assignment to one or more play lists (described in more detail hereinafter), and to assign one or more play lists to PEDD scheduling blocks thereby to assign GDC data files 170 for scheduled exhibition on remote PEDD display systems 200. GDC scheduling module 323 further provides remote-clients 300 users with appropriate rights with functional capabilities to add, modify, reconfigure, reassign, re-prioritize, suspend and delete GDC data files 170 assigned to play lists and play lists assigned to scheduling blocks, as well as start/stop times and dates of play lists and scheduling blocks. GDC scheduling module 323 performs validation tests on display content files 170 selected and assigned for scheduled exhibition on remote PEDD display systems 200 to validate that said files meet minimum use and format requirements for exhibition on selected remote PEDD display systems 200 or display groups, as appropriate to the uses and functions of enterprise network system 100.

GDC scheduling approval module 324 is a functional module which provides a command structure, graphical interface and support services that enable users with scheduling approval rights to approve or disapprove GDC schedules created for use with selected remote PEDD display systems 200 and display groups. GDC scheduling approval module 324 provides remote-clients 300 users with functional capabilities provided by remote client application 320 and presented within a GUI window (not shown) generated within web browser 315 to view preview files created from GDC data files 170 scheduled for exhibition, to view scheduling blocks and play lists submitted for approval, to view configuration and status information about remote PEDD display systems 200 selected for scheduling, and to approve or disapprove GDC schedules as appropriate.

GDC file download module 325 is a functional module which provides a command structure, graphical interface and support services that enable remote-client 300 users with GDC file download rights to retrieve GDC data files 170 from media library to which they have rights residing in disk-vault 150 of central server 101 and download them to remote-client 300 local memory or off-line storage (not shown). This capability allows client users to retrieve GDC data files 170 for use with out-of-network PEDD display systems (not shown), not configured as part of enterprise network system 100. GDC file download module 32S provides remote-client 300 users with functional capabilities provided by remote client application 320 and presented within a GUI window (not shown) generated within web browser 315 to view lists of GDC data files 170 residing within media library, to select one or more said files for downloading, and to download selected files as required to remote-clients 300.

PEDD time management module 326 is a functional module which provides a command structure, graphical interface and support services that enable client users with rights to apportion and manage time segments for exhibition of GDC data files 170 on remote PEDD display systems 200. PEDD time management module 326 provides remote-clients 300 users with functional capabilities provided by remote client application 320 and presented within a GUI window (not shown) generated within web browser 315 to configure the continuous operating period, or duty cycle, of remote PEDD display systems 200 into multiple display time portions, or segments, based on advantageous criteria for use thereof. The default display time segment for any given remote PEDD display systems 200 is advantageously configured as the nominal continuous operating period, or duty cycle, thereof. It shall be understood by those skilled in the art that the nominal continuous operating period of typical remote PEDD display systems 200 is a 24-hour day period of continuous operation; and shall be further understood that the nominal continuous operating period of other typical remote PEDD display systems 200 is more than a 24-hour day period of continuous operation; whereas the nominal continuous operating period of still other typical remote PEDD display systems 200 is less than a 24-hour day period of continuous operation; wherein notwithstanding the default display time segment thereof remains advantageously configured as the nominal continuous operating period, or duty cycle, thereof.

The nominal continuous operating period, or duty cycle, and therewith the default display time segment, is apportioned or segmented by a remote-client 300 user with rights using PEDD time management module 326. By way of example, the nominal continuous operating period of a given remote PEDD display system 200 may be apportioned or segmented into multiple portions based on hours or portions of hours, hour block periods or hour portion block periods, day block periods or day portion block periods (e.g., morning, afternoon, evening, night), week block periods or week portion block periods (e.g., Monday through Thursday, Friday through Sunday) or similar time-based criteria. By further way of example, the nominal continuous operating period of remote PEDD display systems 200 could be apportioned or segmented into multiple portions based on time of day, day of week, week of month, month of year, season of year, or similar criteria. Said apportionment of the nominal continuous operating period of remote PEDD display systems 200 provides an advantageous framework, or matrix, and advantageous means thereof, to perform expeditious and efficient scheduling of GDC data files 170 for exhibition on selected remote PEDD display systems 200 and display groups using GDC scheduling module 323. Further, said apportionment of said nominal continuous operating period of said remote PEDD display systems 200 and display groups provides advantageous means wherein portions or segments of the nominal continuous operating period of remote PEDD display systems 200 and display groups may be offered for lease-use sale and said lease-use sales of said operating period portions or segments may be expeditiously and efficiently transacted and recorded using PEDD lease-use sales module 327, as appropriate to the uses and functions of enterprise network system 100.

PEDD lease-use sales module 327 is a functional module which provides a command structure, graphical interface and support services that enable client users with rights to assign for lease-use by other enterprise network users said portions or segments of the nominal continuous operating period of remote PEDD display systems 200 as configured by remote-client 300 users of PEDD time management module 326. PEDD lease-use sales module 327 provides remote-client 300 users with functional capabilities provided by remote client application 320 and presented within a GUI window (not shown) generated within web browser 315 to view preview files of GDC data files 170, to view scheduling blocks and play lists for one or more remote PEDD display systems 200, to determine which operating time portions or segments have been leased or otherwise assigned for use, to further determine which operating time portions or segments are currently available for lease-use sale, to transact lease-use sales agreements of selected operating time portions or segments with other enterprise network users, and to record lease-use sales transaction records, as appropriate, for later review or retrieval. PEDD lease-use sales module 327 advantageously provides client users with functional capabilities to view PEDD scheduling blocks and GDC play lists created for selected remote PEDD display systems 200 by day, by week, or by month. Once lease-user rights to operating time portions or segments of remote PEDD display devices 200 are granted to enterprise network users by conclusion of sale, they are designated as unavailable for use by other enterprise network users. Thereinafter, enterprise users with rights may schedule GDC data files 170 for exhibition in accordance with those operating time portions or segments to which they have been granted lease-use rights.

Enterprise task management module 328 is a functional module which provides a command structure, graphical interface and support services that enable client users with rights to view current status of enterprise workflow process tasks and to take appropriate task actions as appropriate to their roles. Task management module 328 provides remote-client 300 users with functional capabilities provided by remote client application 320 and presented within a GUI window (not shown) generated within web browser 315 to request task actions by other enterprise network users and to be notified of status of requested task actions. For example, task action requests relating to the GDC data file approval process shall include: (1) request for approval of GDC data file for exhibition and notification of request received to the requesting user; (2) notification of approval of GDC data file for exhibition by an approving user to the requesting user; (3) request for change of GDC data file for exhibition and notification of request received to the requesting user; (4) notification of approval of GDC file change request by an approving user to the requesting user; (5) request to approve PEDD schedule and notification of request received to the requesting user; (6) notification of approval of PEDD schedule by an approving user to the requesting user; (7) request to modify GDC schedule and notification of request received to the requesting user; (8) notification of approval of PEDD schedule change request by an approving user to the requesting user; and, (9) termination of GDC file approval process and notification of process termination by an approving user to the requesting user.

Enterprise reports module 329 is a functional module which provides a command structure, graphical interface and support services that enable client users with rights to request, access and view enterprise network system reports generated by central server 101 from information provided by enterprise network services such as lease-use sales data, task management process data and network administrative and operations data; as well as information provided by enterprise network client devices such as run-time and error logs, configuration status information and schedule verification data. Reports module 329 provides remote-client 300 users with functional capabilities provided by remote client application 320 and presented within a GUI window (not shown) generated within web browser 315 to request enterprise reports from central server 101, to view enterprise reports transmitted upon request from central server 101 to remote-clients 300, and to store enterprise reports to local disk storage of remote-clients 300 for later retrieval.

Mode of Operation

Figure 6:
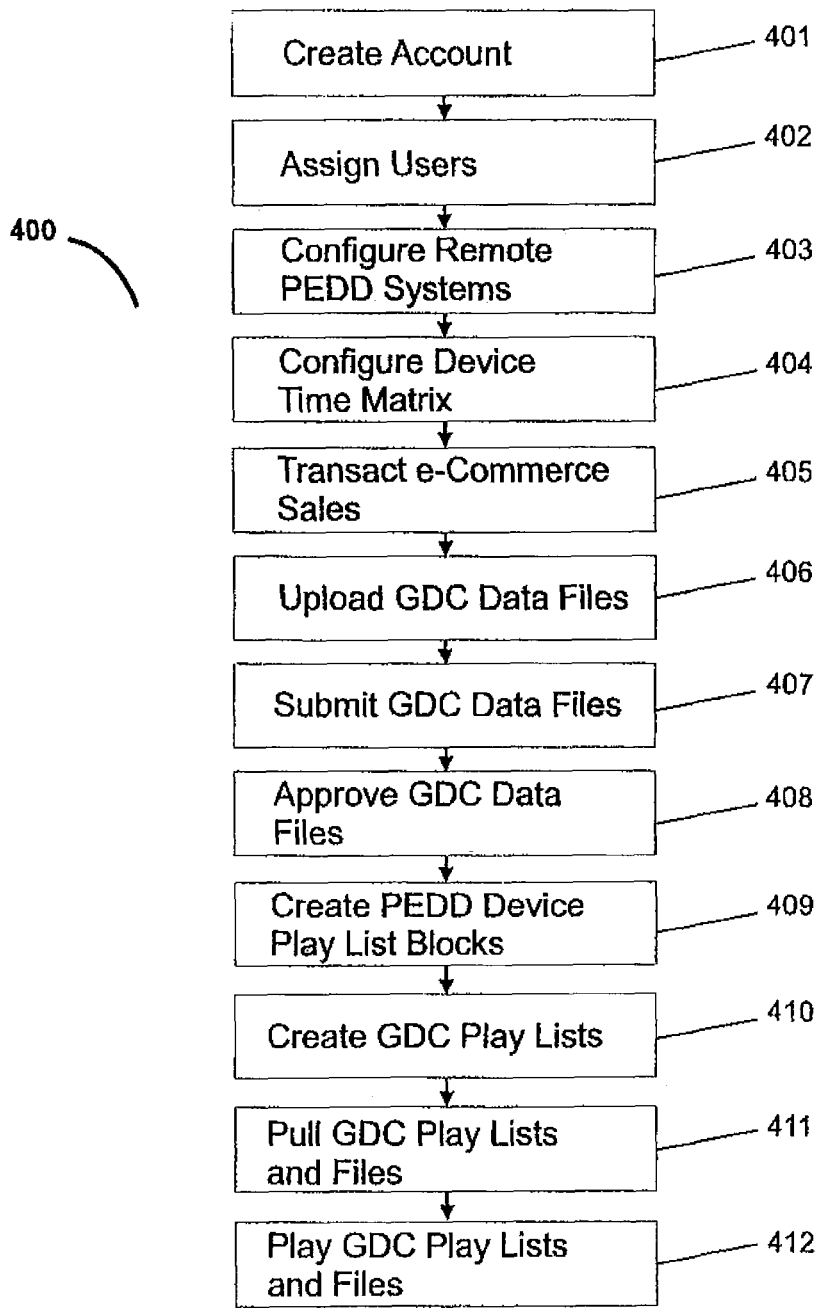
FIG. 6 is a simple process flow diagram depicting the fundamental mode of operation of the enterprise network system.

FIG. 6 is a functional block diagram illustrating the basic mode of operation 400 for enterprise network system 100 showing the various operating functional stages 401 through 412 by which enterprise users make use of enterprise network system 100 of the present invention.

Mode of operation 400 is initiated when a network system administrator of client server 101 creates an enterprise network account for an account-holder using local interface application 123 of central server 101 (ref. FIG. 2). Create Account stage 401 comprises the workflow process tasks of creating and maintaining a unique enterprise network account for an account-holder who might be an individual, a business, a PEDD display system operator, or other entity. Network system administrators at Create Account stage 401 assign identification and configuration information about the enterprise network account including a unique account identifier, account name, ownership or business name, address, billing information, account contact information, and account user information. An enterprise network account must be created and user rights authenticated before any enterprise network resources become available to the account-holder and account users. A network system administrator at create account stage 401 further assigns vault location for the account-holder in disk vault 150 using local interface application 123 and configures media library space wherein GDC data files 170 and their corresponding preview files may be securely stored and retrieved. The network system administrator at create account stage 401 further creates an account-holder super-ordinate user, or account administrator, granted super-ordinate rights and privileges to access and use enterprise network resources and capabilities provided to the account including the right to create a plurality of sub-ordinate users, or account sub-users, and to grant sub-users with an appropriate sub-set of administrator rights and privileges based on roles, thereby enabling account sub-users access to and use of a sub-set of enterprise network resources and capabilities granted to the account. Account sub-users make use of enterprise network accounts in accordance with user rights assigned to them on the basis of roles, which includes network system administrator, enterprise account administrator, PEDD display system owner/operator, graphical content creator, graphical content purveyor, lease-use holders, e-commerce sales specialist, and content service provider, among others, as appropriate to the uses and functions of enterprise network system 100. Upon completion, account sub-users are notified of rights and privileges assigned to them to use account resources by task management module 328 of remote client application 320.

Advantageously, sub-users created for one enterprise account may be granted rights and privileges to other accounts through the use of a share code-key, an encrypted data string authentication means, provided to a sub-user when the sub-user is assigned to an enterprise account and provided notification. The share code-key allows enterprise account administrators to configure user associations and assign rights and privileges to users within associations to account resources and capabilities. For example, a remote PEDD display system owner/operator with an enterprise device account may desire to provide rights and privileges to sub-users of other enterprise accounts to access and use remote PEDD display systems 200 capabilities, thereby enabling enterprise users to conduct PEDD lease-use sales, to create PEDD display schedules, and to assign GDC data files 170 to PEDD display schedules for exhibition on remote PEDD display systems 200 to which they have been assigned rights by inclusion in user associations created for the PEDD display system owner/operator's device accounts. The network system administrator or account administrator assigns a user to a user association by requesting the user to provide their share code-key, which provides means to authenticate said user and grant account rights and privileges as appropriate.

Mode of operation 400 includes Assign Users stage 402 wherein a network system administrator, or other user with appropriate rights, creates one or more enterprise account sub-user accounts with appropriate rights based on roles to access and use a sub-set of network resources and privileges granted to the enterprise account at Create Account stage 401. Assign Users stage 402 comprises the workflow process tasks of creating and maintaining enterprise account sub-user records, of creating user associations for the enterprise account, and of assigning rights to sub-users based on roles, as appropriate to the uses and functions of enterprise network system 100. Upon task completion, new users assigned to enterprise accounts are notified that said assignment has been made and existing account users are notified of new users assigned to their accounts or to their user associations, by task management module 328 of remote client application 320.

Mode of operation 400 includes Configure Remote PEDD Systems stage 403 wherein a network system administrator of central server 101 using local interface application 123 configures remote PEDD display system 200 as a network-enabled resource within enterprise network 100. Configure Remote PEDD Systems stage 403 comprises the workflow process tasks of identifying a remote PEDD display system 200 as a network-conversant device, creating an enterprise device account for said network-conversant remote PEDD display system 200, and operatively linking said network-conversant remote PEDD display system 200 to said enterprise device account as a network-enabled resource, thereby enabling enterprise users to access and use said remote PEDD display system 200 capabilities and resources based on rights and privileges granted by the enterprise device account owner. Configure Remote PEDD Systems stage 403 workflow process tasks further comprise grouping a plurality of remote PEDD display systems 200 into display groups based on any of various criteria such as device location, regional proximity, similarity of operating characteristics and functional capabilities, and other criteria, as network-enabled resources for enterprise users with rights to access and use, as appropriate to the uses and functions of enterprise network system 100. Upon task completion, enterprise device account holders are notified of creation and configuration status of remote PEDD display system client device accounts and of PEDD display system groups by task management module 328 of remote client application 320.

Mode of operation 400 includes Configure Device Time Matrix stage 404 wherein a user with appropriate rights apportions the nominal continuous operating period or duty-cycle (heretofore described) of one or more network-enabled remote PEDD display systems 200 into operating sub-periods that define and delineate optimal and sub-optimal periods for exhibiting visual output images 230 on remote PEDD display systems 200. Configure Device Time Matrix stage 404 comprises the workflow process tasks of apportioning the nominal continuous operating period or duty-cycle of remote PEDD display systems 200 into operating sub-periods based on time-of-day, day-of-week, week-of-month, month-of-year, or other time-based or event-based criteria deemed appropriate and efficacious to defining optimal and sub-optimal periods to exhibit visual output images 230 on electronic display boards 220 of remote PEDD display systems 200; said operating sub-periods being of equal or non-equal duration and of sequential repeating or sequential non-repeating instances. Upon task completion, enterprise device account holders are notified of the creation of device time matrix for a given PEDD display system by task management module 328 of remote client application 320.

Figure 7:
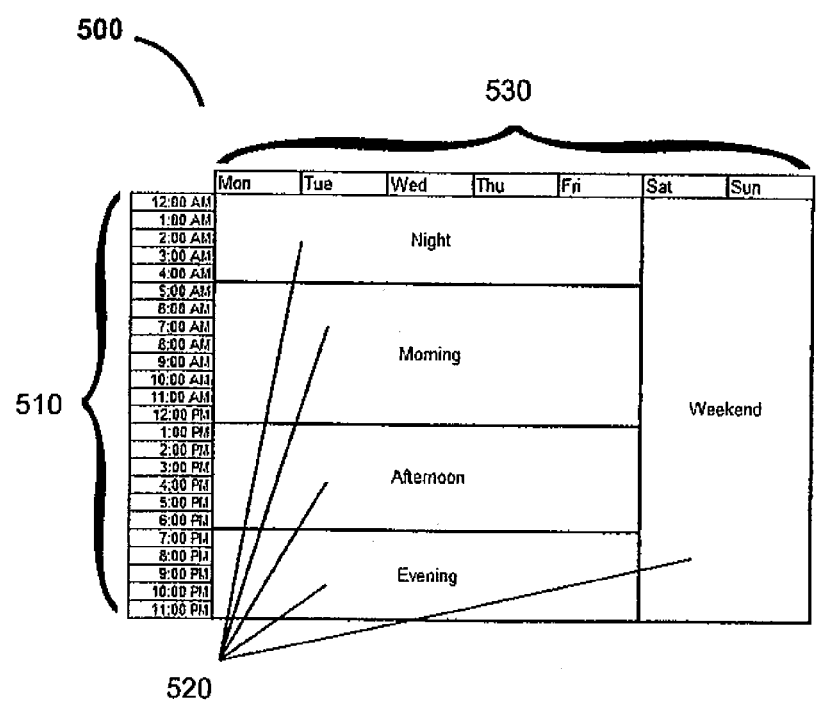
FIG. 7 is illustrates an example schema as may be applied to apportion the nominal operating period or duty cycle of remote PEDD display systems into discrete operating sub-periods.

For purposes of example only, FIG. 7 illustrates one such apportioning schema 500 of the nominal continuous operating period or duty-cycle of remote PEDD display system 200 into optimal and sub-optimal operating sub-periods based on time-of-day 510 apportioned into hour segments, period of day 520 apportioned into day-part blocks or whole-day blocks, and day-of-week 530 apportioned into day-part segmented blocks for five week days and whole-day blocks for two week-end days. It shall be understood by those skilled in the art that the example as shown in FIG. 7 is neither limiting in intent nor in scope of the present invention and that said operating sub-periods for optimal and sub-optimal scheduled exhibition of GDC data files 170 on remote PEDD display systems 200 may be alternatively denoted, designated, or described as display-time parts or blocks, time modules, event periods or modes, or any similar such nomenclature, but that any such nomenclature identifies the same object as the present invention and therefore obtains the same benefits and advantages thereof.

Advantageously, Configure Device Time Matrix stage 404 further comprises the workflow process tasks of presenting said optimal and sub-optimal operating sub-periods as time-based or event-based matrices or grids of discrete network-enabled resources of enterprise network system 100, and means thereof, wherein lease-use sale and scheduling of GDC data files 170 on remote PEDD display systems 200 may be expeditiously and efficiently performed by users with appropriate rights at Transact e-Commerce Sales stage 405 and Create PEDD Device Play List Blocks stage 409 described hereinafter.

Mode of operation 400 includes Transact e-Commerce Sales stage 405 wherein a user with appropriate rights can view said matrix or grid of operating sub-periods created at Configure Device Time Matrix stage 404 and offer for lease-use sale to enterprise network lease-use buyers those discrete operating sub-periods of remote PEDD display systems 200 available for use. Initially upon creation of the matrix of discrete operating sub-periods at Configure Device Time Matrix stage 404 (ref. FIG. 7), none of the sub-periods has been assigned for lease-use to any enterprise network user. Transact e-Commerce Sales stage 405 comprises the workflow process tasks of identifying for a prospective lease-use buyer a selection of available discrete operating sub-periods based on value criteria such as site location of a given remote PEDD display system 200, relative optimal/sub-optimal ranking of discrete operating sub-periods, and duration of discrete operating sub-periods. Value criteria eminent in the aforesaid selection may be broadened or refined by the prospective lease-use buyer such as operating sub-period lease-use cost, number of exposures of visual output images 230 possible within selected discrete sub-periods, repetition of sub-period selection over time or per event, and similar such said value criteria. Transact e-Commerce Sales stage 405 further comprises the workflow process tasks of concluding lease-use sale, recording transaction records of lease-use sale, and assigning a one or a plurality of discrete operating sub-periods or portions thereof to the lease-use buyer for subsequent scheduling of GDC data files 170 at Create GDC Play Lists stage 410. Upon task completion, the lease-use buyer, an enterprise network user, is notified of lease-use tights by task management module 328 of remote client application 320 and the matrix or grid of operating sub-periods created at Configure Device Time Matrix stage 404 is updated by central server 101 enabling other enterprise network users to determine that discrete operating sub-periods or portions thereof have been leased for use by enterprise users.

It would be obvious to one skilled in the art that any selection of available discrete operating sub-periods offered for lease-use sale may be selective of sequential or non-sequential operating sub-period instances, or selective of random operating sub-period instances, or selective of repeating or non-repeating schema of operating sub-period instances, of equal or non-equal duration, and of any combination thereof, as deemed eminently value appropriate and conducive for conclusion of lease-use sale, as appropriate to the uses and functions of enterprise network system 100.

Mode of operation 400 includes Upload GDC Data Files stage 406 wherein a user with appropriate rights uploads GDC data files to selected media libraries located on disk vault 150. Upload GDC Data Files stage 406 comprises the workflow process tasks of locally viewing preview files of GDC data files 170 selected for upload at remote client 300; modifying data associated with GDC data files 170 such as file name, file creation and modification dates, period of use such as a start date and stop date, and other such information, and uploading GDC data files 170 into said selected media libraries within disk vault 150 for subsequent assignment to one or more remote PEDD display systems 200 at Create GDC Play Lists stage 410. Media library server 124 of central server 101 (ref. FIG. 2) authenticates remote-client 300 user rights to upload GDC data files 170 to selected media library before allowing GDC data file 170 upload to occur, as appropriate to the uses and functions of enterprise network system 100.

Mode of operation 400 includes Submit GDC Data Files stage 407 wherein an enterprise network user with appropriate rights designates GDC data files 170 uploaded at Upload GDC Data Files stage 406 ready for exhibition on remote PEDD display systems 200 or display system groups created at Configure Remote PEDD Systems stage 403. Submit GDC Data files stage 407 comprises workflow process tasks wherein a user with rights views preview files of GDC data files 170 within selected media libraries residing on disk-vault 150 and designates them ready for approval by enterprise network users with approval rights, such as PEDD display system 200 device account holders, and ready for scheduling by enterprise network users with scheduling rights, such as lease-use account holders, or their associated sub-users, respectively. Upon task completion, enterprise network users with approval rights are notified of new approval tasks pending by task management module 328 of remote client application 320.

Mode of operation 400 includes Approve GDC Data Files stage 408 wherein an enterprise network user with appropriate rights may approve or disapprove the use of GDC data files 170 submitted for exhibit on remote PEDD display systems 200 at Submit GDC Data Files stage 407. Approve GDC Data Files stage 408 comprises workflow process tasks wherein an enterprise network user with file approval rights views preview files of GDC data files 170 submitted and designated ready for exhibition on remote PEDD display systems 200 and re-designates submitted GDC data files 170 as approved or disapproved for use. Upon task completion, enterprise network users awaiting file approval are notified of approval status by task management module 328 of remote client application 320.

Figure 8:
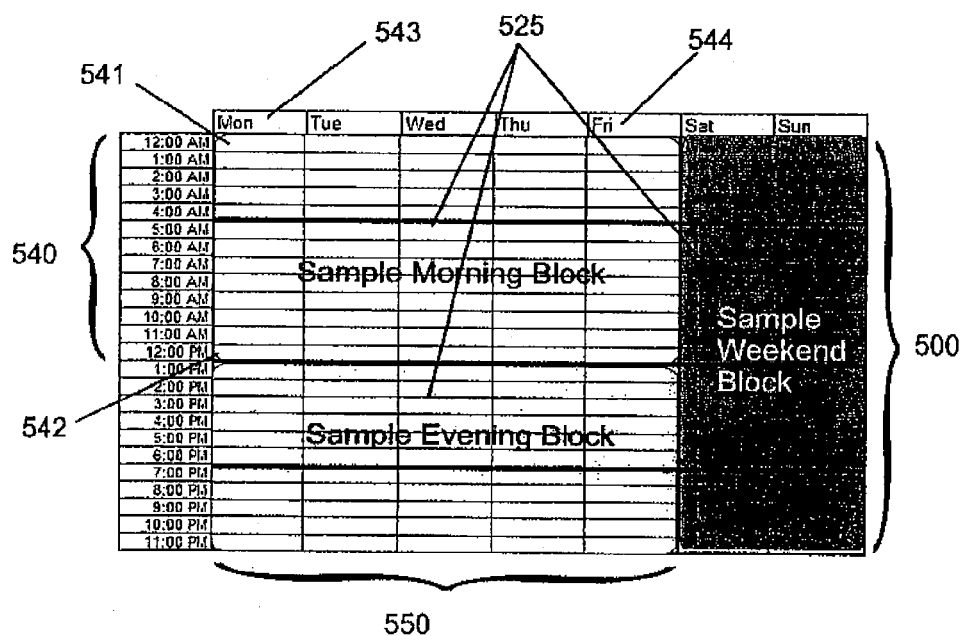
FIG. 8 illustrates an example schema as may be applied to concatenate discrete operating sub-periods apportion schema into ordered body schema.

Mode of operation 400 includes Create PEDD Device Play List Blocks stage 409 wherein a user with appropriate rights may designate a concatenated group of discrete operating sub-periods created during Configure Device Time Matrix stage 404 as a discretionary ordered body, or play list block 525, as shown in FIG. 8, for defining an exhibiting framework of time-based or event-based instances during which a selection of GDC data files 170 may be scheduled for exhibition on remote PEDD display systems 200. Said play list block 525 is adherent to device time matrix 500 (ref. FIG. 7) and comprises an ordering of discrete operating sub-periods thereof designating sequential instances 540 and lateral instances 550 therein concatenated into a discretionary ordered body, or block 525. Create PEDD Device Play List Blocks stage 409 comprises workflow process tasks wherein a user with appropriate rights initiates creation of a play list block, assigns a block name or other meaningful identifier to said play list block, designates a start time 541 and stop time 542 for said play list block encompassing a group of sequential instances of discrete operating sub-periods, designates a commencement point 543 and conclusion point 544 encompassing lateral instances of said group of sequential instances of discrete operating sub-periods, assigns priority value for order of precedence to the play list block 525, and records the whole for later reference by other enterprise users. Upon task completion, enterprise users are notified of the creation of play list blocks 525 for remote PEDD display systems 200 to which they have rights by task management module 328 of remote client application 320.

Figure 9:
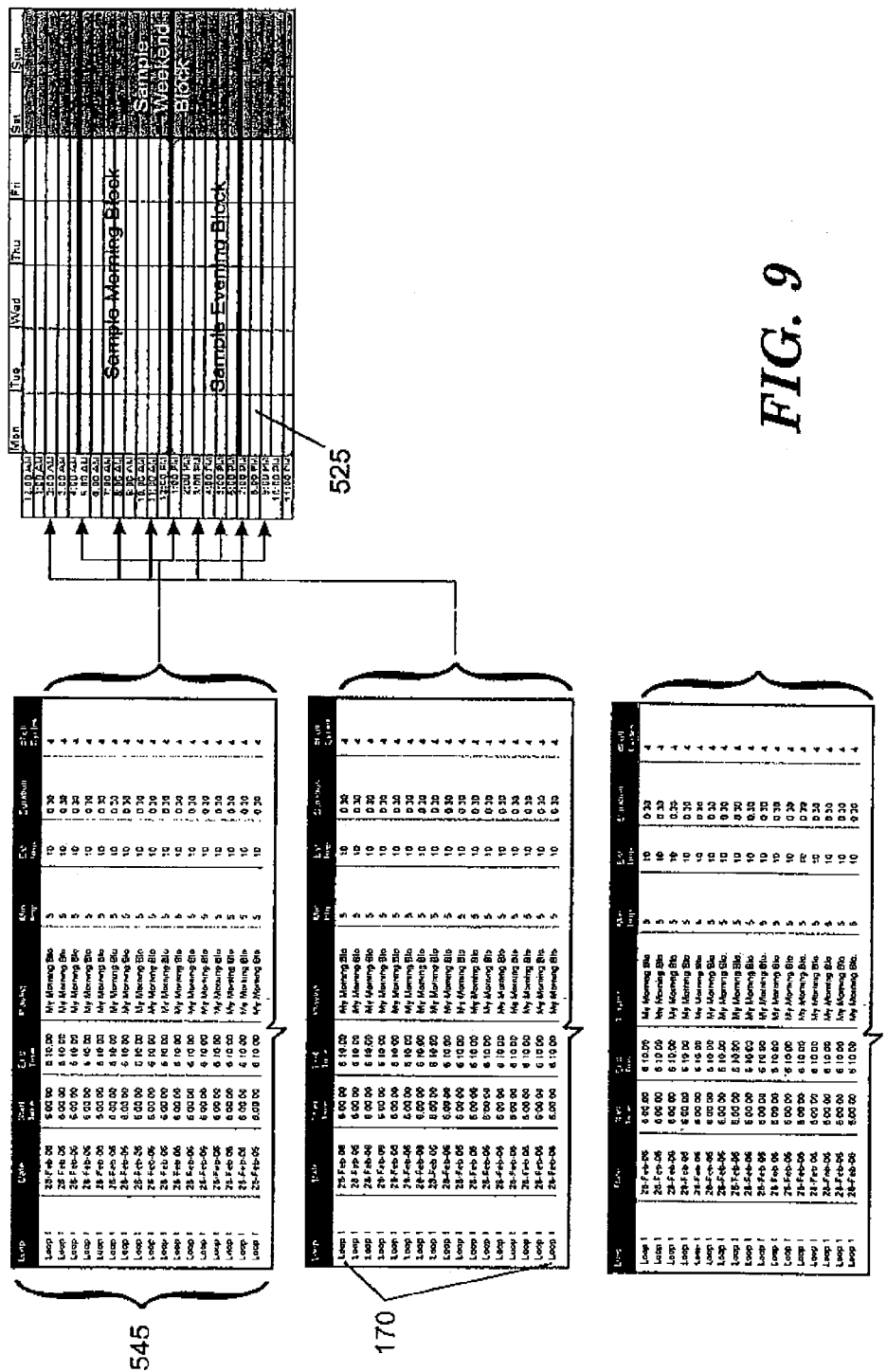
FIG. 9 illustrates an example manifest of graphical display content data files as may be applied to ordered body schema to assign same to remote PEDD display systems for exhibition.

Mode of operation 400 includes Create GDC Play Lists stage 410 wherein a user with appropriate rights designates a group of GDC data files 170 as a discretionary ordered body, or GDC play list 545 (ref. FIG. 9), and links one or more said GDC play lists 545 to PEDD play list blocks 525 created at Create PEDD Device Play List Blocks stage 409. As shown in FIG. 9, multiple GDC play lists 545 may be associated to PEDD play list blocks 525. Said multiple GDC play lists 545 may play multiple times within said PEDD play list blocks 525. GDC data files 170 assigned to GDC play lists 545 may appear multiple times within said GDC play lists 545. Multiple said GDC play lists 545 may be variously ordered within said PEDD play list block 525. Create GDC Play Lists stage 410 comprises workflow process tasks wherein a user initiates creating a GDC play list 545, assigns a play list name or other meaningful identifier to the play list (not shown), views preview files of GDC data files 170 submitted for display at Submit GDC Data Files stage 407 and approved for display at Approve GDC Data Files stage 408, assigns GDC data files 170 to GDC play lists 545 and assigns said GDC play lists 545 to said PEDD play list blocks 525, thereby scheduling GDC data files 170 for exhibition on remote PEDD display systems 200 or display groups to which they have been assigned by inclusion in said GDC play lists 545. Upon task completion, enterprise users are notified of the creation of GDC play lists 545 and assignment of GDC play lists 545 to PEDD play list blocks 525 for those remote PEDD display systems 200 to which they have rights by task management module 328 of remote client application 320.

Figure 4:
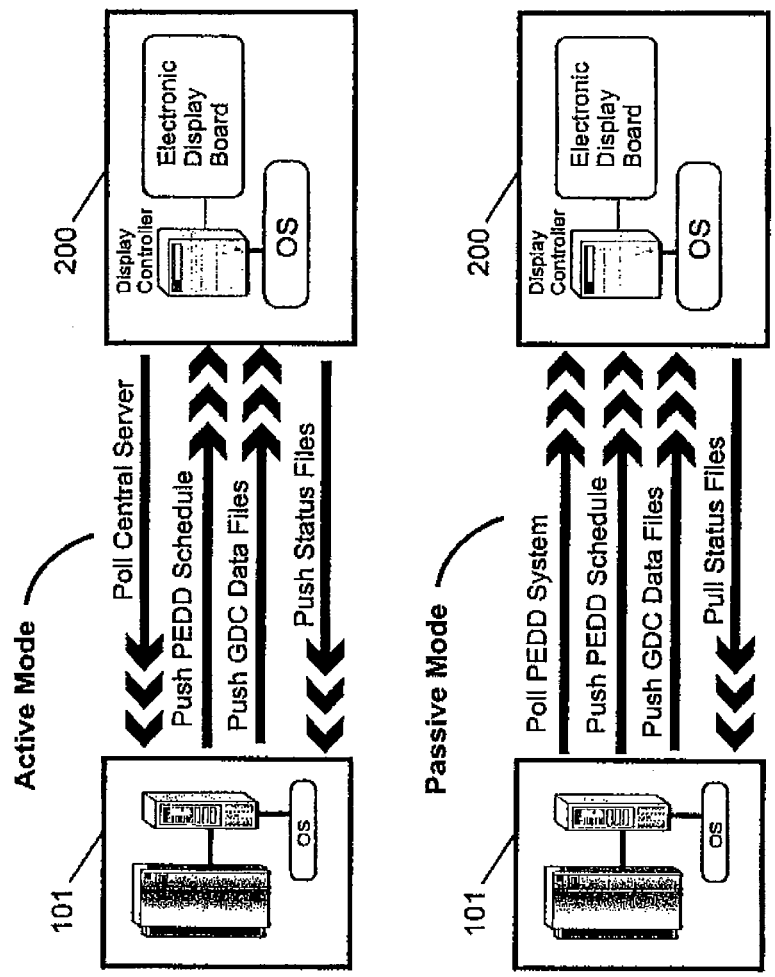
FIG. 4 is a conceptual illustration depicting two preferred embodiments of communications methodology for data file transfer between network-enabled remote PEDD display systems and a central server of the enterprise network system.

Mode of operation 400 includes Pull GDC Play Lists and Files stage 411 wherein remote PEDD display system 200 within enterprise network system 100 (ref. FIG. 4) automatically polls central server 101 to receive updated PEDD schedule information, updated GDC data files, diagnostic and configuration requests, and configuration update files, and responds with appropriate action. Pull GDC Play Lists and Files stage 411 comprises workflow process wherein remote PEDD display systems 200 automatically initiate and establish communication with central server 101 via global network 110 by periodic polling or by scheduled service requests, queries central server 101 for updated GDC play lists 545 created at Create GDC Play Lists stage 410, and downloads updated GDC play lists 545 to display schedule module 242 (ref. FIG. 3) and GDC data files 170 assigned to said updated GDC play lists 545 to GDC data file storage module 243 of display controller 210. Additional workflow process comprises responding to operating status, diagnostic and configuration requests from central server 101 by uploading information such as run-time and error logs and configuration status information, as appropriate to the request.

Mode of operation 400 includes Play GDC Play Lists and Files stage 412 wherein remote PEDD display systems 200 automatically convert GDC data files 170 into corresponding output image data and display control signals operatively driving electronic display board 220 (ref. FIG. 3) thereby exhibiting visual output images 230 for viewing by a viewing party or public. Play GDC Play Lists and Files stage 412 comprises workflow process of executing updated GDC play lists 545, converting GDC data files 170 assigned to said GDC play lists 545 into output image data, stationing output image data in storage means such as a local disk-drive (not shown), transmitting output image data to frame buffer module 246 to operatively drive visual output image 230 on electronic display board 220, and to log successful exhibition of visual output image 230 in a run-time log, or an error event in an error log, for use in satisfying diagnostic and status requests by central server 101 during a future polling event.

Figure 10:
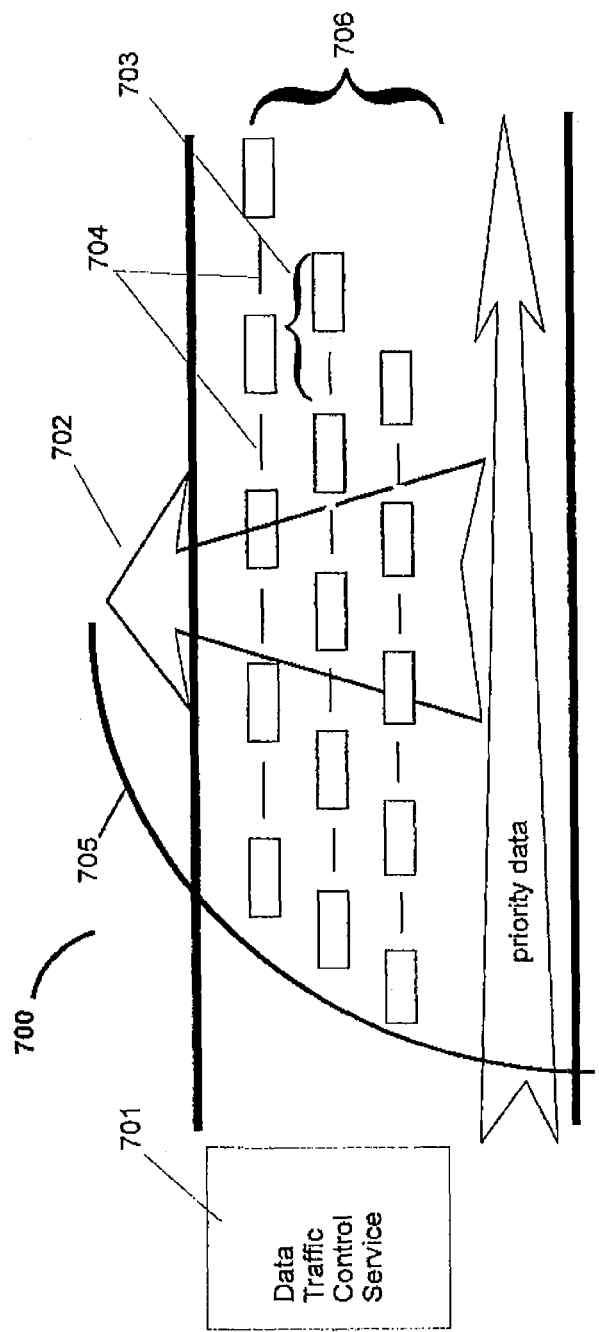
FIG. 10 is a conceptual diagram depicting a preferred embodiment of network data traffic control means.

Advantageously, the enterprise network system 100 of the present invention, in one embodiment, allows for a possibility that optimizes mode of operation 400 by managing enterprise user demand for enterprise network services during peak use periods. FIG. 10 is a conceptual diagram illustrating enterprise network data traffic control means 700. Central server 101 is equipped with a data traffic control service 701 operatively enabled to monitor and control data traffic across enterprise network system 100. In operation, as enterprise network user demand exceeds a threshold number of active connections 702, data traffic control service 701 of central server 101 executes logarithmic slowing (or "throttling") of data packet transfer time 703 by adding a delay period 704 between data packets thereby slowing data transfer rate per each active connection of enterprise network client devices including remote clients 300 and remote PEDD display devices 200. As the number of active connections 702 increases, the delay time period added between data packets increases accordingly, as shown by the logarithm curve 705. Network traffic control means 700 applies only to non-priority data traffic management such as email communication, task management status updates, and similar communications considered non-critical to optimum operation of enterprise network system 100. Priority data traffic such as transfer of GDC data files 170, preview files and DDM streaming media between central server 101 and enterprise network client devices is exempt from network traffic control. Alternatively, logarithmic slowing (or "throttling") may not be employed if desired.

Various modifications can be made to the present invention without departing from the apparent scope thereof.

What is claimed is:

1. An enterprise network server configured for communication over a network to a plurality of remotely located programmable electronic display devices (PEDDs), the enterprise network server comprising:
    a scheduling module for assigning graphical display content from a plurality of digital files to display on the PEDDs based on one or more schedules;
    a conversion module for converting the graphical display content to a format usable by the PEDDs, the graphical display content provided to the enterprise network server in one or more media file formats having graphical content encoded with one or more codecs incompatible for processing by the PEDDs, and the graphical display content being converted to at least a first media file format and a second media file format having graphical content encoded with one or more codecs compatible for display by respective PEDDs, wherein media file formats compatible for display by the respective PEDDs are determined from identifying characteristics maintained by the enterprise network server for the respective PEDDs; and a transfer module for transmitting the converted graphical display content and display commands over the network to the respective PEDDs, the converted graphical display content being selected for transfer to the respective PEDDs in the first media file format or the second media file format based on matching the converted graphical display content with a file format compatible with display components for the respective PEDDs, the display components of the respective PEDDs identifiable in the identifying characteristics maintained by the enterprise network server using unique identifiers associated with the respective PEDDs;

wherein the display components of the PEDDs comprise a display controller, network communication interface configured for communication with the enterprise network server, and electronic display board having a plurality of light-emitting pixel elements, wherein the display controller includes a data file conversion module configured for producing output image signals usable by the electronic display board from the converted graphical display content stored in the data file storage in a particular file format; and wherein the PEDDs are configured for displaying the output image signals on the plurality of light-emitting pixel elements in the electronic display board at times indicated by the one or more schedules responsive to processing of the display commands with the display controller.

2. The enterprise network server of claim 1, further comprising:

a preview module for enabling previewing of the graphical display content, and viewing scheduling blocks, playlists, and display groups associated with the graphical display content.

3. The enterprise network server of claim 1, wherein the scheduling module is configured for coordinating display times across a plurality of the PEDDs sited in remote locations, and creating scheduling blocks, playlists, and display groups for a selected grouping of PEDDs.

4. The enterprise network server of claim 1, wherein the graphical display content is pre-validated and pre-formatted for use by selected PEDDs based on operating and data use criteria.

5. The enterprise network server of claim 1, wherein the plurality of remotely located PEDDs include a first PEDD configured for accepting dynamic video graphical display content in a first dynamic video media file format, and a second PEDD configured for accepting static graphical display content in a second static graphic media file format, wherein the conversion module is configured for converting the graphical display content to both the first dynamic video media file format and the second static graphic media file format.

6. The enterprise network server of claim 1, further comprising a configuration module for maintaining configuration records of the respective PEDDs, the configuration records including device type, use requirements, and operating characteristics of the respective PEDDs, wherein the configuration module applies rules and restrictions for submission, conversion, assignment, and scheduling of the graphical display content for display on the respective PEDDs.

7. The enterprise network server of claim 1, further comprising an access module for operatively managing secure access to and use of the enterprise network server, the PEDDs, and the graphical display content, by a class of enterprise network system users.

8. The enterprise network server of claim 7, wherein the access module is integrated with the scheduling module for operatively managing secure access by the class of enterprise network system users to apportion a nominal operating period of the PEDDs into discrete operating sub-periods according to one or more value criteria.

9. The enterprise network server of claim 1, further comprising network server applications providing a web-based interface to enable remote users to create, upload, and modify the graphical display content, and to schedule, approve, and affect display of the graphical display content on the respective PEDDs.

10. A programmable electronic display device, comprising:

a display board providing a plurality of light-emitting elements;

a display controller operably coupled to the display board, comprising:

a display board control module to manage provisioning of output image data to the light-emitting elements and provide display board control signals to the display board;

a graphical display content conversion module to convert graphical data content into the output image data;

a display schedule module to maintain a schedule of graphical data content for display on the display board; and a communications module operably coupled to the display board and the display controller, and configured to control sending and receiving communications with the programmable electronic display device, the communications including graphical data content provided from a remote location for display on the display board, and specifications of the schedule of graphical data content;

wherein the graphical data content provided from the remote location for display on the display board is converted, at the remote location, from a media file format having graphical display content having graphical content encoded with one or more codecs incompatible for display on the display board into another media file format having graphical content encoded with one or more codecs compatible for display on the display board, the another media file format determined from identifying characteristics of the programmable electronic display device maintained by the remote location;

wherein the display controller includes data file storage for storing the graphical data content received from the remote location, and wherein the graphical display content conversion module is configured for converting the graphical data content stored in the data file storage from the media file format into output image signals usable by the display board; and wherein the graphical data content is selected for transfer from the remote location to the programmable electronic display device in the media file format based on matching the graphical data content with a file format compatible with characteristics of the display controller, the characteristics of the display controller identifiable at the remote location using an unique identifier associated with the programmable electronic display device.

11. The programmable electronic display device of claim 10, the display controller further comprising:
a graphical display content storage module storing the graphical display content for retrieval by the display board control module according to the schedule of graphical display content; and
a display operating system coordinating device operations between the graphical display content storage module and the communications module.

12. The programmable electronic display device of claim 10, the display controller further comprising a controller diagnostics module for generating and maintaining device diagnostic data, and a controller configuration module for executing on-demand modifications to software operating in the programmable electronic display device.

13. The programmable electronic display device of claim 10, wherein the communications module is operatively configured to communicate with a server at a location remote to the programmable electronic display device via a network connection.

14. The programmable electronic display device of claim 13, wherein the communications occur with the server at periodic or scheduled intervals via a polling method, the polling method causing the programmable electronic display device to request and establish a communications session with the server, the communications session transmitting and receiving data between the server and the programmable electronic display device including a set of graphical display content.

15. The programmable electronic display device of claim 13, wherein the communications occur with the server at periodic or scheduled intervals passively via a command-response method, the command-response method including receiving a series of instructions from the server causing the programmable electronic display device to request and establish a communications session with the server upon demand, and to transmit and receive data between the server and the programmable electronic display device including a set of graphical display content.

16. The programmable electronic display device of claim 10, wherein the programmable electronic display device is operably coupled to a remotely accessible communications interface configured for managing secure access and use of the programmable electronic display device by a class of users, enabling the class of users to apportion operating time of the programmable electronic display device into segments.

17. A system, comprising:
a programmable electronic display device (PEDD), the PEDD comprising a display controller, device operating system, network communication interface, and electronic display board, the electronic display board including a plurality of light-emitting elements for displaying graphical display content received via the network communication interface, wherein the display controller includes data file storage for storing the received graphical display content, and wherein the display controller includes a data file conversion module configured for producing output image signals usable by the electronic display board from the graphical display content stored in the data file storage in a particular media file format; and
an enterprise network server operably coupled to the PEDD and remotely located from the PEDD, the enterprise network server configured to transmit converted graphical display content to the network communication interface of the PEDD, wherein the enterprise network server provides an internet-accessible interface for controlling display of the graphical display content onto the PEDD based on operating characteristics of the PEDD, and wherein the converted graphical display content transmitted to the network communication interface of the PEDD is converted by the enterprise network server from a media file format having graphical content encoded with one or more codecs incompatible for processing or display by the PEDD into the particular media file format having graphical content encoded with one or more codecs compatible for display by the PEDD, wherein the particular media file format compatible for display by the PEDD is determined from identifying characteristics maintained for the PEDD at the enterprise network server, and wherein the graphical data content is selected for transfer from the enterprise network server to the PEDD in the particular media file format based on matching the graphical data content with a file format compatible with characteristics of the display controller, the characteristics of the display controller identifiable by the enterprise network server using an unique identifier associated with the PEDD.

18. The system of claim 17, wherein the enterprise network server provides an integrated suite of network-based applications, services, and resources configured for secure access by a plurality of enterprise network system users, providing functionality for apportioning operating time of the programmable electronic display device into one or more segments, and for assigning the graphical display content for display on the PEDD in connection with the one or more segments.

19. A process performed in connection with display control operations of an enterprise network system, comprising:
storing graphical display content data in a media library embodied on a storage memory, the media library providing the graphical display content data for assignment to a plurality of remote programmable electronic display devices (PEDDs);
transmitting and assigning the graphical display content data to respective of selected remote PEDDs for display based on apportioned operating times of the respective selected remote PEDDs, the graphical display content data being selected for transfer to the respective selected remote PEDDs in a first media file format or a second media file format based on matching the graphical display content data with a file format compatible with display components for the respective selected remote PEDDs, the display components of the respective selected remote PEDDs having identifying characteristics maintained by the enterprise network server that are identifiable using unique identifiers associated with the respective selected remote PEDDs, the graphical display content data provided to the enterprise network server in one or more media file formats having graphical content encoded with one or more codecs incompatible for processing by the respective selected remote PEDDs, and the graphical display content data being converted to at least the first media file format and the second media file format having graphical content encoded with one or more codecs compatible for display by the respective selected remote PEDDs;
validating the graphical display content data assigned to the respective selected remote PEDDs;
converting the graphical display content data into digital output image data and display control signals for display of the graphical display content data on a display screen of the selected remote PEDDs, wherein the selected remote PEDDs include data file storage for storing the converted graphical display content data received from the enterprise network server, and wherein the selected remote PEDDs include a data file conversion module configured for producing the converted graphical display content data stored in the data file storage from a particular file format into the display control signals for the display; and causing display of the digital output image data on the display screen of the respective selected remote PEDDs, using the display control signals to produce visual output during the apportioned operating times of the respective selected remote PEDDs.

20. The process of claim 19, wherein converting the graphical display content data into digital output image data includes pre-formatting the graphical display content data into one or more predetermined media file formats in accordance with chosen operating and data use criteria of the selected remote PEDDs.

21. The process of claim 20, wherein converting the graphical display content data into digital output image data further includes converting the graphical display content into a first dynamic video media file format and a second static graphic media file format, wherein the selected remote PEDDs include a first PEDD configured for accepting digital output image data in the first dynamic video media file format, and a second PEDD configured for accepting digital output image data in the second static graphic media file format.

22. The process of claim 19, further comprising coordinating display times across the selected remote PEDDs, and creating scheduling blocks, playlists, and display groups for the selected remote PEDDs.

23. The process of claim 19, further comprising transmitting graphical display content and graphical display content playlists to the selected remote PEDDs for display, wherein the graphical display content data is converted into the digital output image data and the display control signals on the respective selected remote PEDDs.

24. The process of claim 19, further comprising managing secure access to and use of the selected remote PEDDs and the graphical display content, by a class of enterprise network system users.

25. The process of claim 19, further comprising providing a web-based interface to enable remote users to create, upload, and modify the graphical display content, and to schedule, approve, and affect display of the graphical display content on the selected remote PEDDs.

* * * * *